(12) United States Patent
Honda

(10) Patent No.: US 9,022,660 B2
(45) Date of Patent: May 5, 2015

(54) ROLLING BEARING

(71) Applicant: Eagle Industry Co., Ltd., Tokyo (JP)

(72) Inventor: Shigeki Honda, Tokyo (JP)

(73) Assignee: Eagle Industry Co., Ltd. (JP)

( * ) Notice: Subject to any disclaimer, the term of this patent is extended or adjusted under 35 U.S.C. 154(b) by 0 days.

(21) Appl. No.: 14/335,692

(22) Filed: Jul. 18, 2014

(65) Prior Publication Data

US 2014/0376846 A1  Dec. 25, 2014

Related U.S. Application Data

(63) Continuation-in-part of application No. 14/055,781, filed on Oct. 16, 2013, now Pat. No. 8,920,035, which is a continuation-in-part of application No. 13/579,139, filed as application No. PCT/JP2011/065254 on Jul. 4, 2011, now Pat. No. 8,585,295.

(30) Foreign Application Priority Data

Jul. 5, 2010 (JP) .................................. 2010-152868

(51) Int. Cl.
F16C 33/72 (2006.01)
F16J 15/43 (2006.01)
F16C 33/66 (2006.01)
F16C 33/76 (2006.01)
(Continued)

(52) U.S. Cl.
CPC ............. *F16C 33/66* (2013.01); *F16C 2226/18* (2013.01); *F16C 2300/02* (2013.01); *F16C 33/6633* (2013.01); *F16C 33/6644* (2013.01); *F16C 33/765* (2013.01); *F16C 35/061* (2013.01); *F16C 19/08* (2013.01); *F16C 2380/18* (2013.01)

(58) Field of Classification Search
CPC ...... F16C 33/765; F16C 33/6644; F16J 15/43
USPC ........... 384/410–412, 446, 462; 277/301, 302
See application file for complete search history.

(56) References Cited

U.S. PATENT DOCUMENTS 5,704,613 A   1/1998  Holtkamp ..................... 277/302
7,129,609 B1  10/2006  Mikhalev et al. ............ 310/90.5

FOREIGN PATENT DOCUMENTS

| JP | 56070130 | 6/1981 | .............. F16C 33/66 |
| JP | 60076053 | 4/1985 | .............. F16C 33/10 |
| JP | 63101520 | 5/1988 | .............. F16C 33/82 |

(Continued)

OTHER PUBLICATIONS

PCT Notification of Transmittal of Translation of the International Preliminary Report on Patentability, dated Feb. 21, 2013 (6 pgs).

(Continued)

*Primary Examiner* — Phillip A Johnson
(74) *Attorney, Agent, or Firm* — Hayes Soloway P.C.

(57) ABSTRACT

A rolling bearing used in a power transmission device for transmitting power such as turning force, characterized in that a magnet for holding in a lubrication portion of the rolling bearing a lubricating magnetic fluid for lubricating the lubrication portion is provided on at least one side of an outer race of the rolling bearing, and an annular yoke made of a magnetic material loosely fitted to a rotating shaft is provided on the opposite side of said magnet relative to said outer race, and a cross-sectional profile of the yoke has an I-shape.

6 Claims, 17 Drawing Sheets

(51) Int. Cl.
*F16C 35/06* (2006.01)
*F16C 19/08* (2006.01)

(56) References Cited

FOREIGN PATENT DOCUMENTS

| JP | 3121223 | 12/1991 | ............ F16C 33/66 |
| JP | 63-177325 | 11/1998 | |
| JP | 11166597 | 6/1999 | ............ F16C 33/66 |
| JP | 2003254446 | 9/2003 | ............ F16J 15/43 |
| JP | 2007-078113 | 3/2007 | |
| SU | 655858 | 4/1979 | ............ F16J 15/40 |
| SU | 781469 | 11/1980 | ............ F16J 15/40 |
| SU | 817352 | 3/1981 | ............ F16C 33/72 |

OTHER PUBLICATIONS

Korean Office Action issued in corresponding Patent Appln. Serial No. 10-2012-7023838 dated Oct. 10, 2013, with English translation (8 pgs).
Office Action issued in corresponding Japanese Patent Appln. No. 2012-523852, drafting date Aug. 27, 2014, with English translation (5 pgs).
First Office Action issued in corresponding Chinese Patent Appln. No. 201080032903.2 dated Jul. 25, 2014, with English translation (11 pgs).

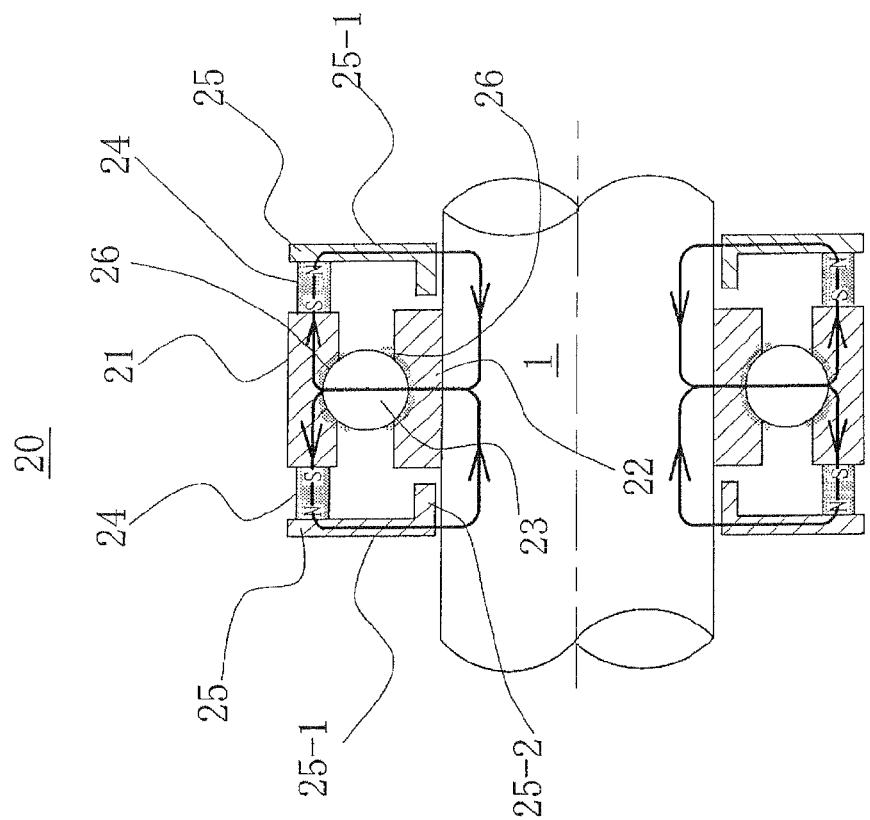
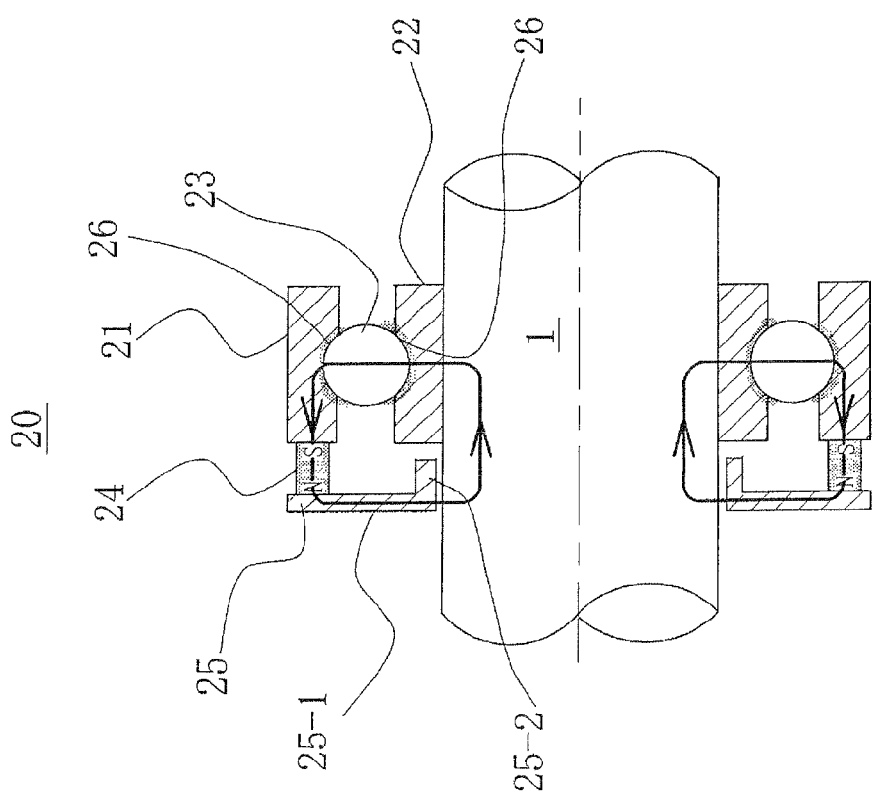
FIG. 3(a)
FIG. 3(b)

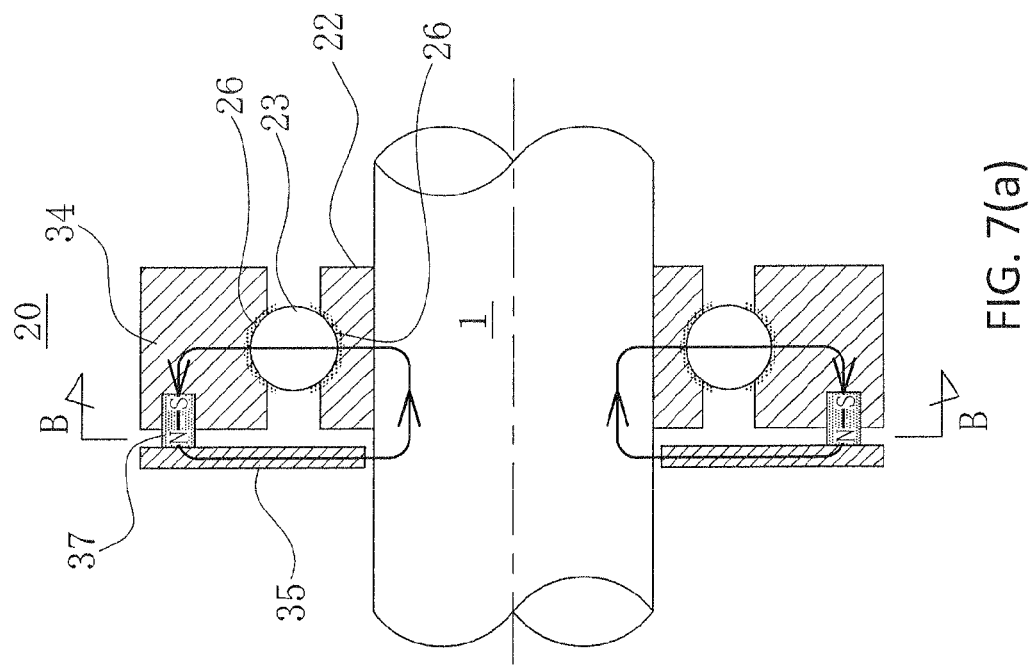
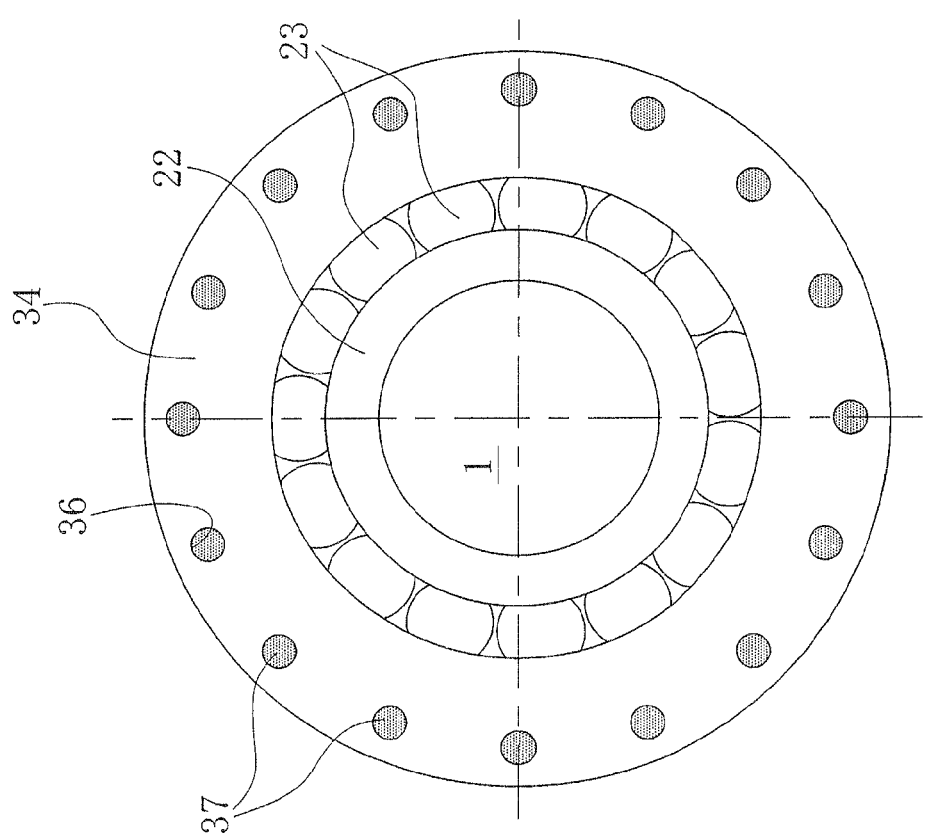
FIG. 7(a)
FIG. 7(b)

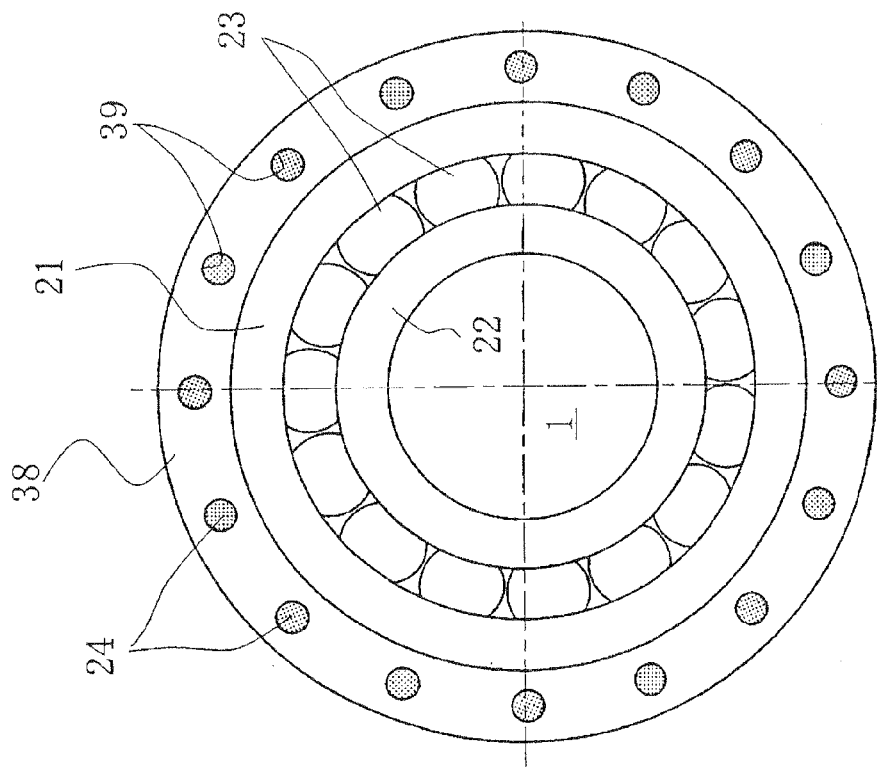
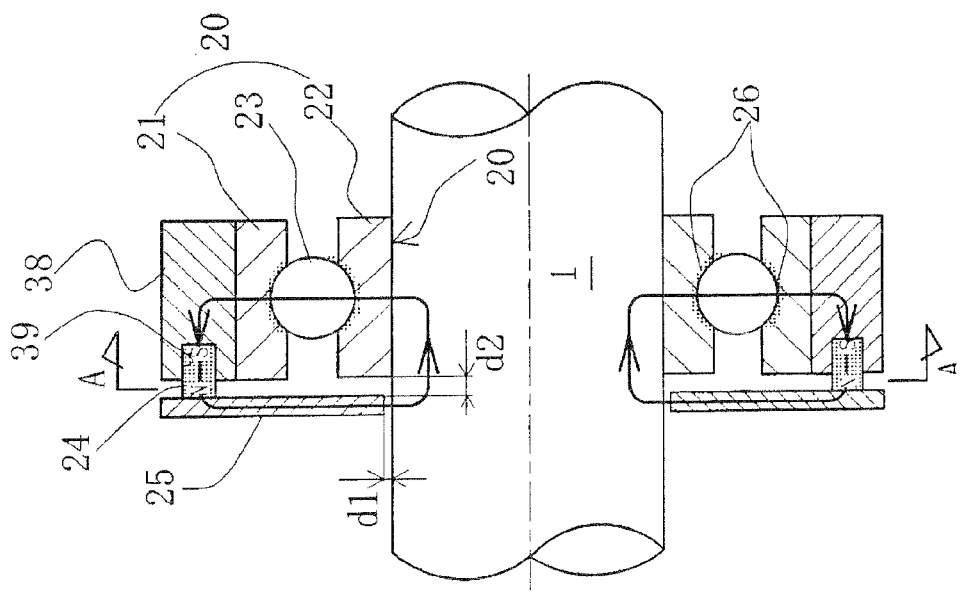
FIG. 11(a)
FIG. 11(b)

ROLLING BEARING

CROSS REFERENCE TO RELATED APPLICATION

This application is a continuation-in-part of co-pending U.S. patent application Ser. No. 14/055,781, filed Oct. 16, 2013, the contents of which are incorporated herein by reference, which in turn is a continuation-in-part of Ser. No. 13/579,139, filed Aug. 15, 2012, now U.S. Pat. No. 8,585,295, which is, in turn, a 371 of PCT/JP11/065254, filed Jul. 4, 2011.

TECHNICAL FIELD

The present invention relates to a rolling bearing and, more specifically, to a rolling bearing employing a magnetic fluid suitable for use in a vacuum field for a device for manufacturing semiconductors, FPD, solar cells, and the like.

BACKGROUND ART

In semiconductor manufacturing devices and the like, for example, a wafer is arranged inside a reaction chamber held in a high vacuum state by a vacuum pump, a reaction gas is introduced, and a thin film is formed using CVD or the like. A work piece has to be transported inside the reaction chamber in a sealed state. In a transporting mechanism used to perform such a task, there has to be a complete, air-tight partition inside the reaction chamber between the arm portion actually holding the work piece and the drive mechanism for transmitting power from outside of the reaction chamber to the arm portion. Also, the generation of dust and the like has to be maximally suppressed on the reaction chamber side. As a result, a drive mechanism is desired for the arm portion inside the reaction chamber which does not generate abrasion powder, lubricant mist, and the like.

In such semiconductor manufacturing devices, a magnetic fluid sealing device such as the one shown in FIG. 16 is used. This magnetic fluid sealing device uses magnetic circuit forming means composed of a pair of pole pieces 102, 103 serving as magnetic pole pieces, and a magnet 104 serving as magnetic force generating means interposed between the pair of pole pieces 102, 103. The pair of pole pieces 102, 103 is installed in a housing 112 via O rings 105, 106 for improving the sealing properties; and a magnetic circuit is formed by the pole pieces 102, 103, the magnet 104, magnetic fluid 107, and a shaft 111 made of a magnetic material. The magnetic fluid 107 is held between the pole pieces 102, 103 and a plurality of ring-shaped protruding ends formed in the shaft 111, and a sealing function is provided for holding the vacuum side, which is the side to be sealed, in a vacuum state (referred to below as "Prior Art 1").

A bearing 110 serving as a bearing section is arranged on the atmosphere side of such a magnetic fluid sealing device 101. The bearing 110 is typically arranged on the atmosphere side of the magnetic fluid sealing device 101, as the device is averse to dust generated by the bearing 110. An angular bearing or the like can be used as the bearing 110, and grease is often used as the lubricant for this bearing 110.

However, in Prior Art 1, the grease usually mixes with the thickeners in the base oil, and this causes some oil separation. This case becomes more pronounced at higher temperatures. When the bearing is of a single-supported-end type as shown in FIG. 16, the separated oil flows out of the bearing 110, mixes with the magnetic fluid 107, and causes the magnetic fluid 107 to deteriorate. A problem is presented in that the pressure resistance and vacuum properties are adversely affected, and the life of the magnetic fluid sealing device 101 is reduced (referred to below as the "Problem 1").

Also, since the separated oil flows out from the bearing 110 on the atmosphere side and dries out, torque is increased. This may damage the bearing in the worst case. Further, when grease is added to the bearing, the device has to be disassembled. This imposes a cumbersome operation.

In a dual-supported-side-type magnetic fluid sealing device in which a bearing is arranged on the vacuum side, Problem 1 occurs as with a single-supported-side-type bearing. A further problem is presented in that bubbles and moisture are discharged into the vacuum, which degrades the vacuum quality inside the vacuum chamber, and pressure fluctuations to occur (referred to below as "Problem 2").

In view of Problem 1 mentioned above, there is known a device in which an oil receiving portion curving downward on the housing side is provided on the upper surface of the pole piece on the atmosphere side. When the grease experiences some oil separation in the bearing and the separated oil flows out from the bearing, it is collected in the oil receiving portion in the bottom portion of the bearing to prevent the oil from admixing with the magnetic fluid (referred to below as "Prior Art 2;" e.g., refer to Patent Document 1).

Also, in view of Problem 2 mentioned above, there is known a device in which, as shown in FIG. 17, magnetic fluid is used instead of grease as a lubricant for first and second ball bearings 113, 114 rotatably supporting the rotary output shaft 121 in a rotary transmission device for transmitting power such as turning force and the like between a vacuum side and an atmosphere side partitioned in airtight fashion by a partitioning wall 120 (referred to below as "Prior Art 3;" e.g., refer to Patent Document 2). Prior Art 3 has an annular first spacer 115 interposed between the outer races of the first and second ball bearings 113, 114, an annular second spacer 116 interposed between the inner races, an annular stepped surface 122a, and a nut 117, whereby the position in the axial direction of the outer race and the inner race of the first and second ball bearings 113, 114 are determined. In order to constitute a magnetic circuit, the first spacer 115 is formed from a ferromagnet such as ferritic or martensitic stainless steel, the axial ends are magnetized to create an N pole and an S pole, and at least a shaft portion 122 of the rotary output shaft 121 is formed from a magnet. In addition, the ball bearings 113, 114 are also made of a commonly used metal magnetic material, the second spacer 116 is made of a non-magnetic material, and the periphery of the contact portions of the ball bearings 113, 114 is formed in a state of being covered by a magnetic fluid.

PRIOR ART DOCUMENTS

Patent Documents

Patent Document 1: Japanese Laid-open Patent Publication No. 2003-254446
Patent Document 2: Japanese Laid-open Patent Publication No. 11-166597

DISCLOSURE OF THE INVENTION

Problems to be Solved by the Invention

In Prior Art 2, the magnetic fluid does not degrade because admixing with oil is prevented, pressure resistance and vacuum properties are not affected, and the life of the magnetic fluid sealing device is extended. However, under vacuum conditions, bubbles and moisture contained in the oil stored in the oil receiving portion are discharged into the vacuum, resulting in a problem in that the vacuum quality inside the vacuum chamber is degraded.

Also, as in Prior Art 3, there is an expectation that particulate such as fine abrasive powder generated in the contact portions of the ball bearings will be reduced by immobilizing a lubricating magnetic fluid using a magnetic circuit using a magnet. However, in actual experiments, as shown in FIGS. 14 and 15, a fairly large amount of particulate is generated compared to a case in which grease is used as the lubricant.

However, the test is set up in an environment such that in a case in which grease is used as the lubricant, a conventional shield is provided for the bearings so that particulate is unlikely to be generated, and such that in a case in which a magnetic fluid is used as the lubricant, a shield is not provided for the bearings and a magnet with weak magnetic force (a weak magnetic field) is used so that particulate is likely to be generated.

An object of the present invention is to solve the problems described above by using a lubricating magnetic fluid as the lubricant for a rolling bearing, immobilizing the lubricating magnetic fluid using a magnetic circuit in which a magnet is employed, and providing a magnetic trap on at least one side of the rolling bearing in order to prevent the generation of mist and particulate, prevent vacuum quality deterioration on the vacuum side and pressure fluctuations, and prevent magnetic fluid sealing device deterioration, and alternatively to eliminate problems such as high-temperature sagging and high torque due to the use Of grease.

Means of Solving the Problems

In order to achieve the object mentioned above, a first aspect of the present invention is a rolling bearing used in a power transmission device for transmitting power such as turning force, characterized in that a magnet for holding in a lubrication portion of the rolling bearing a lubricating magnetic fluid for lubricating the lubrication portion is provided on at least one side of an outer race of the rolling bearing, and an annular yoke made of a magnetic material loosely fitted to a rotating shaft is provided on the opposite side of said magnet relative to said outer race, and a cross-sectional profile of the yoke has an I-shape.

In the first aspect described above, the generation of mist and particulate is prevented, pressure fluctuations and vacuum quality deterioration on the vacuum side are prevented, and magnetic fluid sealing device deterioration is prevented; or problems such as high-temperature sagging and high torque due to the use of grease can be eliminated. Moreover, the yoke can be easily manufactured by having the I-shape in a cross-sectional profile.

A second aspect of the present invention is a rolling bearing according to the first aspect, characterized in that the rotary shaft is formed from a magnetic material, and a magnetic circuit produced when the lubricating magnetic fluid is retained by the lubrication portion is formed by the magnet, the yoke, and the rotating shaft, as well as an inner race, a ball, and an outer race of the rolling bearing.

In the second aspect described above, a magnetic circuit can be formed sufficiently and easily.

A third aspect of the present invention is a rolling bearing according to the first aspect, characterized in that the rotary shaft is formed from a magnetic material or a non-magnetic material, and a magnetic circuit produced when the lubricating magnetic fluid is retained by the lubrication portion is formed by the magnet and the yoke, as well as an inner race, a ball, and an outer race of the rolling bearing.

An advantage of the third aspect described above is that the material of the rotary shaft is not limited to a magnetic material.

A fourth aspect of the present invention is a rolling bearing according to any of the first through third aspects, characterized in that a projecting portion is provided on a side of an annular yoke facing a magnet, a plurality of cylindrical or rectangular recessed portions is provided in a circumferential direction in the projecting portion, the recessed portions opening toward the outer race side of the rolling bearing, and a magnet being fitted into each of the recessed portions.

In the fourth aspect described above, dimensional precision of the magnets is not required when the yoke is manufactured with dimensional precision, a rolling bearing with a simple structure can be installed with dimensional precision, or this can be easily applied to an existing rolling bearing.

A fifth aspect of the present invention is a rolling bearing according to any of the first through third aspects, characterized in that a plurality of cylindrical or rectangular recessed portions is provided in a circumferential direction in the outer race of the rolling bearing, the recessed portions opening toward the yoke, and a magnet being fitted into each of the recessed portions.

In the fifth aspect described above, dimensional precision of the magnets is not required when the outer race of the rolling bearing is manufactured with dimensional precision, a rolling bearing with a simple structure can be installed with dimensional precision, or space in an axial direction of the rolling bearing can be used effectively.

A sixth aspect of the present invention is a rolling bearing used in a power transmission device for transmitting power such as turning force, the rolling bearing characterized in that a magnet for holding in a lubrication portion of the rolling bearing a lubricating magnetic fluid for lubricating the lubrication portion is provided on at least one side of an outer race of the rolling bearing, an annular yoke made of a magnetic material loosely fitted to a rotating shaft is provided on the opposite side of the magnet relative to an outer-race-side member, a cross-sectional profile of the yoke has an I-shape, and the magnet is fitted into a recessed portion provided so as to open toward the yoke at the outer-race-side member.

In the sixth aspect described above, generation of mist and particulate is prevented, pressure fluctuations and vacuum quality deterioration on the vacuum side are prevented, or magnetic fluid sealing device deterioration is prevented, release of particulate to the atmosphere is prevented, and problems such as high-temperature sagging and high torque due to the use of grease can be eliminated. Because the outer-race-side member holds the magnet, dimensional precision of the magnet is not required provided that the outer-race-side member is manufactured with dimensional precision, a rolling bearing with a simple structure can be installed with dimensional precision, and space in an axial direction of the rolling bearing can be used effectively without having too much space.

A seventh aspect of the present invention is the rolling bearing according to the sixth aspect, characterized in that the rotating shaft is formed from a magnetic material, the distance between a surface of the rotating shaft and an inner peripheral surface of the yoke is less than the distance between an inner race of the rolling bearing and the yoke, and a magnetic circuit produced when the lubricating magnetic fluid is retained by the lubrication portion is formed by the magnet and the yoke, as well as the rotating shaft, the inner race of the rolling bearing, a ball, and the outer-race-side member.

In the seventh aspect described above, a magnet trap can be reliably formed by a magnetic circuit between the surface of the rotating shaft and the inner peripheral surface of the yoke.

An eighth aspect of the present invention is the rolling bearing according to the sixth aspect, characterized in that the rotating shaft is formed from a magnetic material or a non-magnetic material, the distance between a surface of the rotating shaft and the inner peripheral surface of the yoke is greater than the distance between an inner race of the rolling bearing and the yoke, and a magnetic circuit produced when the lubricating magnetic fluid is retained by the lubrication portion is formed by the magnet and the yoke, as well as the inner race of the rolling bearing, a ball, and the outer-race-side member.

In the eighth aspect described above, a magnet trap can be reliably formed by a magnetic circuit between the inner race of the rolling bearing and the yoke, and the additional advantage is obtained that the material of the rotating shaft is not limited to a magnetic material.

A ninth aspect of the present invention is the rolling bearing according to any one of the sixth through eighth aspects, characterized in that the recessed portion is cylindrical or rectangular, and are provided in a plurality in a circumferential direction.

In the ninth aspect described above, a plurality of magnets can be provided in the circumferential direction of the outer-race-side member, and the additional advantage is obtained that the magnetic circuit can be formed evenly and densely in the circumferential direction.

Effect of the Invention

The rolling bearing of the present invention exhibits the following exceptional effects.

(1) The generation of mist and particulate is prevented, pressure fluctuations and vacuum quality deterioration on the vacuum side are prevented, and magnetic fluid sealing device deterioration is prevented, or problems such as high-temperature sagging and high torque due to the use of grease can be eliminated by having a magnet for holding in a lubrication portion of the rolling bearing a lubricating magnetic fluid for lubricating the lubrication portion be provided on at least one side of an outer race of the rolling bearing, and by having an annular yoke made of a magnetic material loosely fitted to a rotating shaft be provided on the opposite side of the magnet relative to the outer race. Moreover, the yoke can be easily manufactured by having the I-shape in a cross-sectional profile.

(2) A magnetic circuit can be formed sufficiently and easily by having the rotary shaft be formed from a magnetic material, and a magnetic circuit produced when the lubricating magnetic fluid is retained by the lubrication portion be formed by the magnet, the yoke, and the rotating shaft, as well as an inner race, a ball, and an outer race of the rolling bearing.

(3) An advantage is presented in that the material of the rotary shaft is not limited to a magnetic material by having the rotary shaft be formed from a magnetic material or a non-magnetic material, and by having a magnetic circuit produced when the lubricating magnetic fluid is retained by the lubrication portion be formed by the magnet and the yoke, as well as an inner race, a ball, and an outer race of the rolling bearing.

(4) Dimensional precision of the magnets is not required when the yoke is manufactured with dimensional precision, and a rolling bearing of a simple structure can be installed with dimensional precision, or readily applied to an existing rolling bearing, by having a projecting portion be provided on a side of an annular yoke facing a magnet, a plurality of cylindrical or rectangular recessed portions be provided in a circumferential direction in the projecting portion, the recessed portions opening toward the outer race side of the rolling bearing, and a magnet fitted into each of the recessed portions.

(5) Dimensional precision of the magnets is not required when the outer race of the rolling bearing is manufactured with dimensional precision, a rolling bearing with a simple structure can be installed with dimensional precision, or space in an axial direction of the rolling bearing can be used effectively, by having a plurality of cylindrical or rectangular recessed portions is provided in a circumferential direction in the outer race of the rolling bearing, the recessed portions opening toward the yoke, and a magnet being fitted into each of the recessed portions.

(6) Generation of mist and particulate is prevented, pressure fluctuations and vacuum quality deterioration on the vacuum side are prevented, or magnetic fluid sealing device deterioration is prevented, release of particulate to the atmosphere is prevented, and problems such as high-temperature sagging and high torque due to the use of grease can be eliminated. Because the outer-race-side member holds the magnet, dimensional precision of the magnet is not required provided that the outer-race-side member is manufactured with dimensional precision, a rolling bearing with a simple structure can be installed with dimensional precision, and space in an axial direction of the rolling bearing can be used effectively without having too much space.

(7) The rotating shaft is formed from a magnetic material, the distance between the surface of the rotating shaft and the inner peripheral surface of the yoke is less than the distance between the inner race of the rolling bearing and the yoke, and a magnetic circuit produced when the lubricating magnetic fluid is retained by the lubrication portion is formed by the magnet and the yoke, as well as the rotating shaft, the inner race of the rolling bearing, a ball, and the outer-race-side member. As a result, a magnet trap can be reliably formed by a magnetic circuit between the surface of the rotating shaft and the inner peripheral surface of the yoke.

(8) The rotating shaft is formed from a magnetic material or a non-magnetic material, the distance between a surface of the rotating shaft and the inner peripheral surface of the yoke is greater than the distance between an inner race of the rolling bearing and the yoke, and a magnetic circuit produced when the lubricating magnetic fluid is retained by the lubrication portion is formed by the magnet and the yoke, as well as the inner race of the rolling bearing, a ball, and the outer-race-side member. As a result, a magnet trap can be reliably formed by a magnetic circuit between the inner race of the rolling bearing and the yoke, and the additional advantage is obtained that the material of the rotating shaft is not limited to a magnetic material.

(9) The recessed portion is cylindrical or rectangular, and is provided in a plurality in a circumferential direction. As a result, a plurality of magnets can be provided in the circumferential direction of the outer-race-side member, and the magnetic circuit can be formed evenly and densely in the circumferential direction.

BRIEF DESCRIPTION OF THE DRAWINGS

FIGS. 3(a) and 3 (b) are diagrams used to describe a rolling bearing according to a first embodiment of the present invention in which 3(a) is a front cross-sectional view showing a case in which a magnetic trap is provided on one side of the rolling bearing, and 3(b) is a front cross-sectional view showing a case in which a magnetic trap is provided on both sides of the rolling bearing;

FIGS. 7(a) and 7(b) are views used to describe a rolling bearing according to a fifth embodiment of the present invention in which 7(a) is a front cross-sectional view, and 7(b) is a cross-sectional view from B-B in 7(a);

FIGS. 11(a) and 11(b) are views used to describe a rolling bearing according to an eighth embodiment of the present invention, in which 11(a) is a front cross-sectional view, and 11(b) is a cross-sectional view along A-A in 11(a);

BEST MODE FOR CARRYING OUT THE INVENTION

Embodiments of the rolling bearing of the present invention will now be described in detail with reference to the drawings. The present invention is not intended to be interpreted as being limited to these embodiments; various changes, modifications, and improvements can be added based on the knowledge of persons skilled in the art without departing from the scope of the present invention.

1st Embodiment

Figure 1:
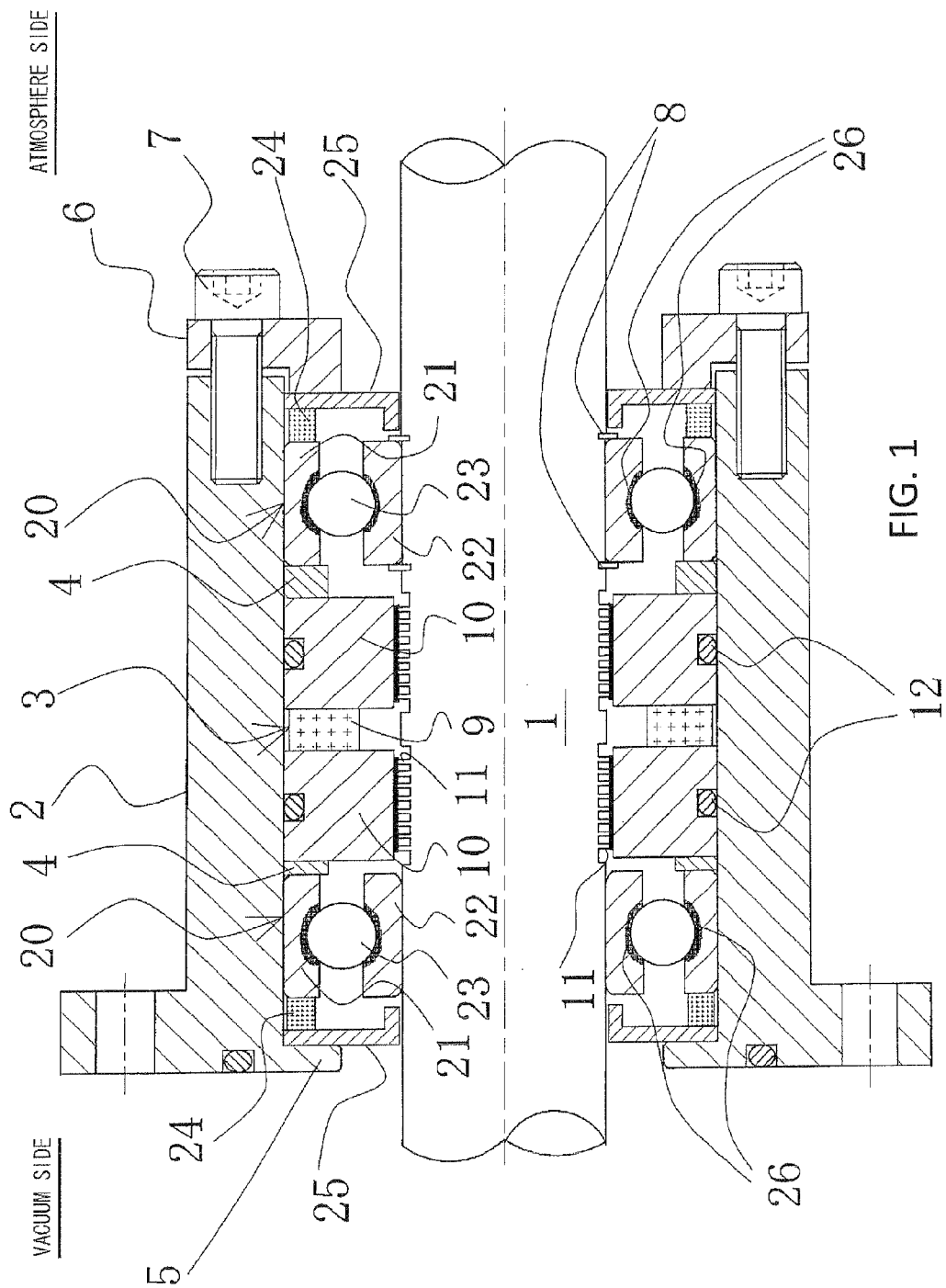
FIG. 1 is a front cross-sectional view showing an example in which a rolling bearing according to a first embodiment of the present invention is applied to a bearing device with a magnetic fluid seal.
Figure 2:
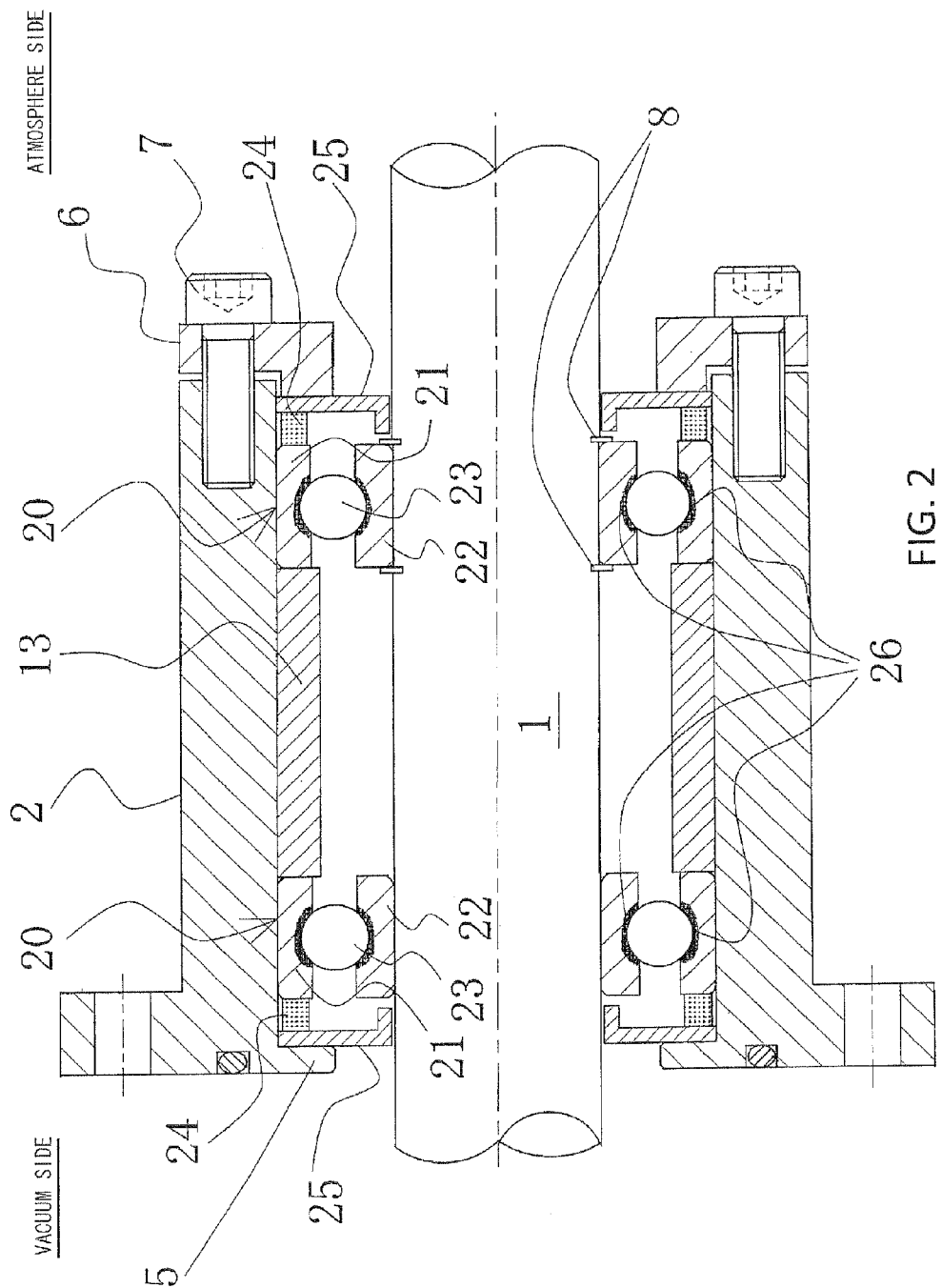
FIG. 2 is a front cross-sectional view showing an example in which a rolling bearing according to a first embodiment of the present invention is applied to a bearing device without a magnetic fluid seal.

FIG. 1 is a front cross-sectional view showing an example in which a rolling bearing according to a first embodiment of the present invention is applied to a bearing device with a magnetic fluid seal, and FIG. 2 is a front cross-sectional view showing an example in which a rolling bearing according to the first embodiment of the present invention is applied to a bearing device without a magnetic fluid seal. Also, FIGS. 3(a) and 3(b) are front cross-sectional views used to describe a rolling bearing 20 according to a first embodiment of the present invention.

In FIGS. 1 and 2, the vacuum side is on the left and the atmosphere side is on the right. However, as shall be apparent, a rolling bearing of the present invention can also have the atmosphere on both sides, or the vacuum on both sides.

In FIG. 1, a bearing device is installed between a housing 2 and a rotary shaft 1, the bearing device sealing the space between the rotary shaft 1 and the housing 2, and rotatably supporting the rotary shaft 1. A magnetic fluid seal 3 is arranged in a central portion inside the housing 2, rolling bearings 20, 20 are arranged on both sides of the magnetic fluid seal 3, and a spacer 4 made of a non-magnetic material is interposed between an outer race 21 or inner race 22 of the rolling bearing 20 and the magnetic fluid seal 3 on the vacuum side, and between the outer race 21 of the rolling bearing 20 and the magnetic fluid seal 3 on the atmosphere side.

A step portion 5 is formed on the left end of the housing 2 on the inner peripheral side; the rolling bearing 20 comes into contact with the step portion 5; and the spacer 4, the magnetic fluid seal 3, the spacer 4, and the rolling bearing 20 are arranged in the stated order towards the right, all being immobilized using a retaining ring 6 and a bolt 7 so that pressure is applied on the step portion 5.

A retaining ring 8 is provided on the rotary shaft 1 corresponding to the position of the rolling bearing 20 on the atmosphere side, and the inner race 22 of the rolling bearing 20 is positioned. The magnetic fluid seal 3 is composed of a magnet 9, and pole pieces 10, 10 arranged on both sides of the magnet. A plurality of protruding portions 11 is formed on the outer peripheral surface of the rotary shaft 1 with respect to the pole pieces 10, 10. An O ring 12 is installed on the outer peripheral surface of the pole piece 10, 10, so that the space between the outer peripheral surface of the pole piece and the inner peripheral surface of the housing 2 is sealed.

In FIG. 2, a bearing device is installed between the housing 2 and the rotary shaft 1, the bearing device sealing the space between the housing 2 and the rotary shaft 1, and rotatably supporting the rotary shaft 1. A spacer 13 made of a non-magnetic material is arranged in the central portion inside the housing 2, and the rolling bearings 20, 20 are arranged on both sides of the spacer 13. A step portion 5 is formed on the left end of the housing 2 on the inner peripheral side; a rolling bearing 20 comes into contact with the step portion 5; and the spacer 13 and the rolling bearing 20 are arranged in the stated order towards the right, all being immobilized using a retaining ring 6 and a bolt 7 so that pressure is applied on the step portion 5.

A retaining ring 8 is provided on the rotary shaft 1 corresponding to the position of the rolling bearing on the atmosphere side, and the inner race 22 of the rolling bearing 20 is positioned.

In FIG. 1 and FIG. 2, the rolling bearing 20 according to the first embodiment of the present invention is a bearing in which are employed ball bearings, rolling bearings, or another rolling element. An outer race 21 is immobilized on the housing 2, and an inner race 22 is immobilized on the rotary shaft 1. Balls 23 are fitted between the outer race 21 and the inner race 22.

Magnets 24 are provided on the vacuum-side surface of the outer race 21 of the rolling bearing 20 on the vacuum side, and on the atmosphere side of the outer race 21 of the rolling bearing 20 on the atmosphere side. In addition, an annular yoke 25 made of a magnetic material and loosely fitted to the rotary shaft 1 is provided on the opposite side of the magnets 24 relative to the outer races 21. In FIG. 1, having a magnetic trap composed of the magnet 24 and the yoke 25 provided on both the vacuum side and the atmosphere side of the rolling bearings 20 enables the release of particulate in the vacuum chamber and the atmosphere to be prevented. In FIG. 1, a magnetic trap is only provided on one side of the rolling bearings 20. A magnetic fluid seal 3 is provided on the side without a magnetic trap. These trap the particulate between the pole piece 10 holding the magnetic fluid and the plurality of protruding portions 11 on the rotary shaft 1. When the lubricating magnetic fluid used in the rolling bearings 20 is different from the magnetic fluid in the magnetic fluid seal and mixing of the two has to be prevented, a magnetic trap is preferably provided on both sides of the rolling bearings 20. The reason for having a magnetic trap provided only on the vacuum side and atmosphere side of the rolling bearings 20 in FIG. 2 is that the two rolling bearings are set apart from each other, and even if particulate is released on the vacuum side and the atmosphere side, it will be trapped and prevented from flowing out by the magnetic traps on both ends. Thus, the design can call for the provision of a magnetic trap on one or both sides of the rolling bearings 20.

A lubricating magnetic fluid 26 is used as the lubricant for the rolling bearing 20 instead of grease, and this lubricates the portions to be lubricated. In order to suitably lubricate the portions to be lubricated over a long period of time, there may be formed a magnetic circuit for holding the lubricating magnetic fluid in the portions to be lubricated.

In order to form a magnetic circuit in this embodiment, a rotary shaft 1 is formed from a magnetic material. The outer race 21, inner race 22, and balls 23 in the rolling bearing 20 are also magnetic and made of commonly used metals.

Broadly speaking, there are three types of magnetic fluids: water-based magnetic fluids, hydrocarbon oil-based magnetic fluids, and fluorine-oil-based magnetic fluids. Hydrocarbon oil-based magnetic fluids and fluorine-based magnetic fluids are used in the rolling bearings 20 of the present invention because they have a low vapor pressure and are unlikely to evaporate in a high vacuum at high temperatures.

Therefore, in the present invention, lubricating magnetic fluid especially refers to a hydrocarbon oil-based magnetic fluid or fluorine-based magnetic fluid.

Also, a permanent magnet made of an organic material or the like filled with, for example, a metal or a magnetic powder can be used as the magnet 24.

FIGS. 3(a) and 3(b) are diagrams used to describe the rolling bearing installed in FIG. 1 and FIG. 2 in which (a) is a front cross-sectional view of a case in which a magnetic trap composed of the magnet 24 and yoke 25 is provided on one side of the rolling bearing, and (b) is a front cross-sectional view of a case in which a magnetic trap composed of the magnet 24 and yoke 25 is provided on both sides of the rolling bearing.

The rotary shaft 1 is formed from a magnetic material, the outer race 21, inner race 22, and balls 23 for the rolling bearing 20 are also magnetic, and a magnetic circuit is formed in the directions indicated by the arrows. In other words, a magnetic circuit is formed from the magnet 24, which is a permanent magnet, via the yoke 25, the rotary shaft 1, the inner race 22, the balls 23, and the outer race 21, before returning to the magnet 24. As a result, the lubricating magnetic fluid 26 is held between the balls 23 and the outer race 21, and between the balls 23 and the inner race 22.

The yoke 25 is ring-shaped and has an inner diameter slightly larger than the diameter of the rotary shaft 1 so as to be loosely fitted on the rotary shaft 1. The cross-sectional shape is L-shaped. The portion contacting the magnet 24 is the vertical portion 25-1 of the L-shape, and the portion facing the surface of the rotary shaft 1 is the horizontal portion 25-2 of the L-shape. The horizontal portion 25-2 extends toward the inner race 22.

Since the yoke 25 is arranged on the vacuum side of the magnet 24, that is, on the vacuum side relative to the balls 23, particulate from magnetic fluid generated by the turning of the balls 23 is trapped by the yoke 25, and the particulate is prevented from infiltrating to the vacuum side. There is a slight gap between the yoke 25 and the surface of the rotary shaft 1, and particulate is believed to infiltrate the vacuum side through this gap. However, since a magnetic circuit is formed between the horizontal portion 25-2 of the yoke 25 and the surface of the rotary shaft 1, the particulate is efficiently trapped and cannot enter the vacuum side.

2nd Embodiment

Figure 4A:
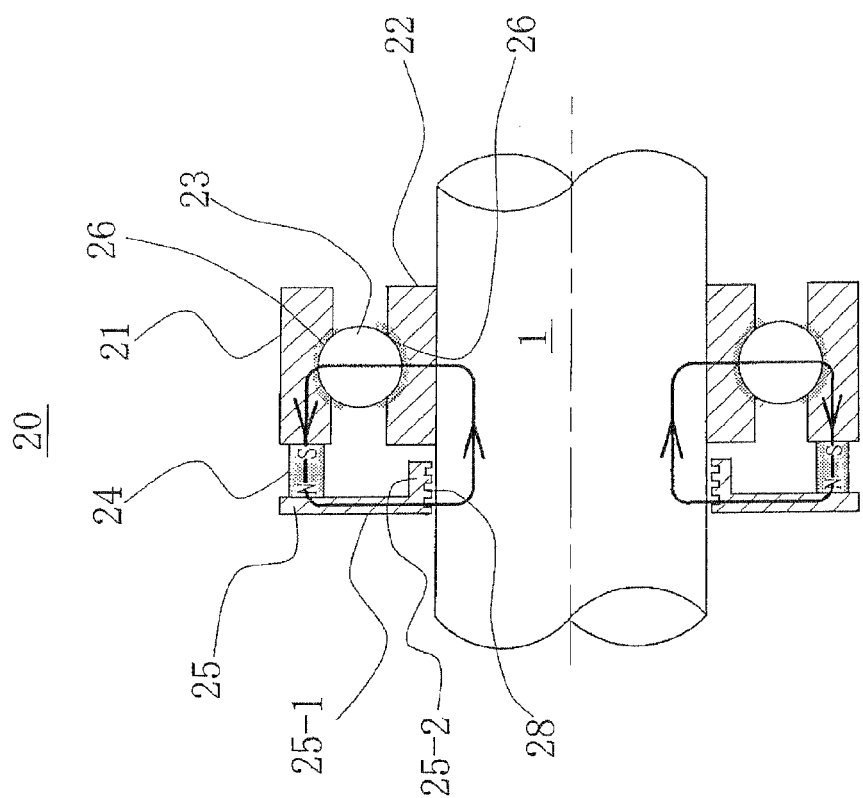
FIGS. 4(a) and 4(b) are front cross-sectional views used to describe a rolling bearing according to a second embodiment of the present invention.
Figure 4B:
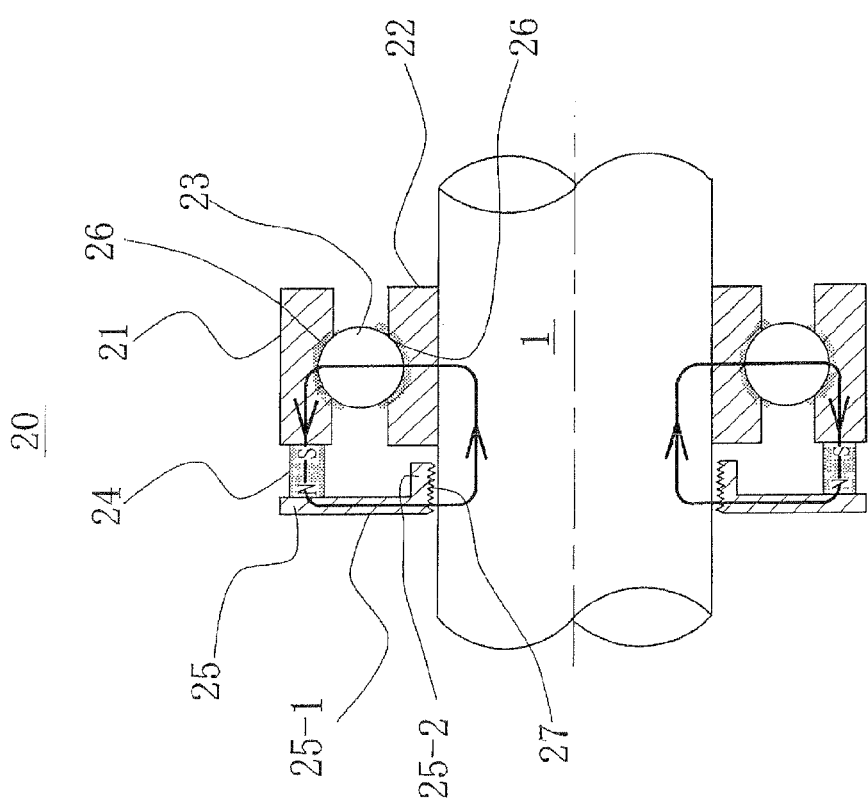

FIGS. 4(a) and 4(b) are front cross-sectional views used to describe a rolling bearing 20 according to a second embodiment of the present invention.

The basic structure of the rolling bearing 20 according to the second embodiment is similar to that according to the first embodiment. In FIGS. 4(a) and 4(b), components denoted by the same reference numerals as those in FIGS. 3(a) and 3(b) are identical to those in FIGS. 3(a) and 3(b). The following is primarily an explanation of the portions differing from those in the first embodiment.

In FIGS. 4(a) and 4(b), the ring-shaped yoke 25 has an L-shaped cross-section as in the first embodiment. The portion contacting the magnet 24 is the vertical portion 25-1 of the L-shape, and the portion facing the surface of the rotary shaft 1 is the horizontal portion 25-2 of the L-shape. The horizontal portion 25-2 extends toward the inner race 22.

In FIG. 4 (a), a sawtooth-shaped uneven portion 27 is formed on the surface of the horizontal portion 25-2 of the yoke 25 facing the surface of the rotary shaft 1.

In FIG. 4 (b), a square-thread-shaped uneven portion 28 is formed on the face of the horizontal portion 25-2 of the yoke 25 facing the surface of the rotary shaft 1.

The particulate can be efficiently trapped as a consequence of the sawtooth-shaped uneven portion 27 or the square-thread-shaped uneven portion 28 being formed on the face of the horizontal portion 25-2 of the L-shape facing the surface of the rotary shaft 1.

3rd Embodiment

Figure 5:
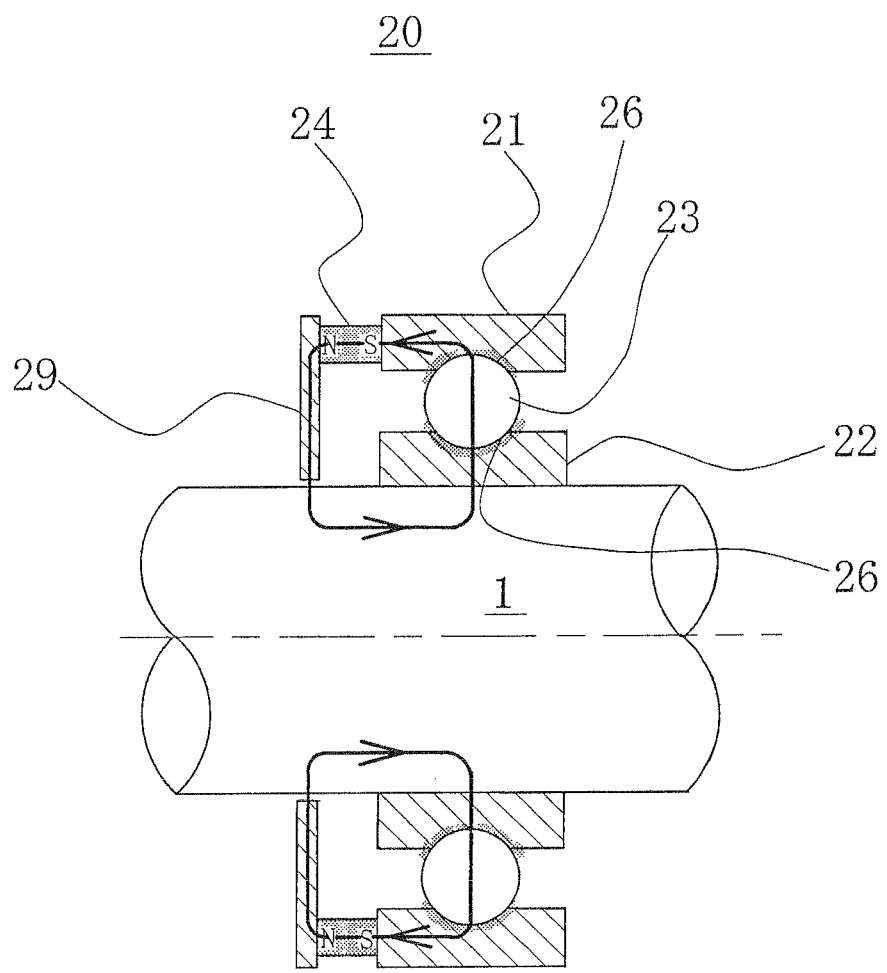
FIG. 5 is a front cross-sectional view used to describe a rolling bearing according to a third embodiment of the present invention.

FIG. 5 is a front cross-sectional view used to describe a rolling bearing 20 according to a third embodiment of the present invention.

The basic structure of the rolling bearing 20 according to the third embodiment is similar to that according to the first embodiment. In FIG. 5, components denoted by the same reference numerals as those in FIGS. 4(a) and 4(b) are identical to those in FIGS. 4(a) and 4(b).

A ring-shaped yoke 29 in FIG. 5 has an I-shaped cross-section.

This makes the yoke 29 easier to manufacture.

4th Embodiment

Figure 6A:
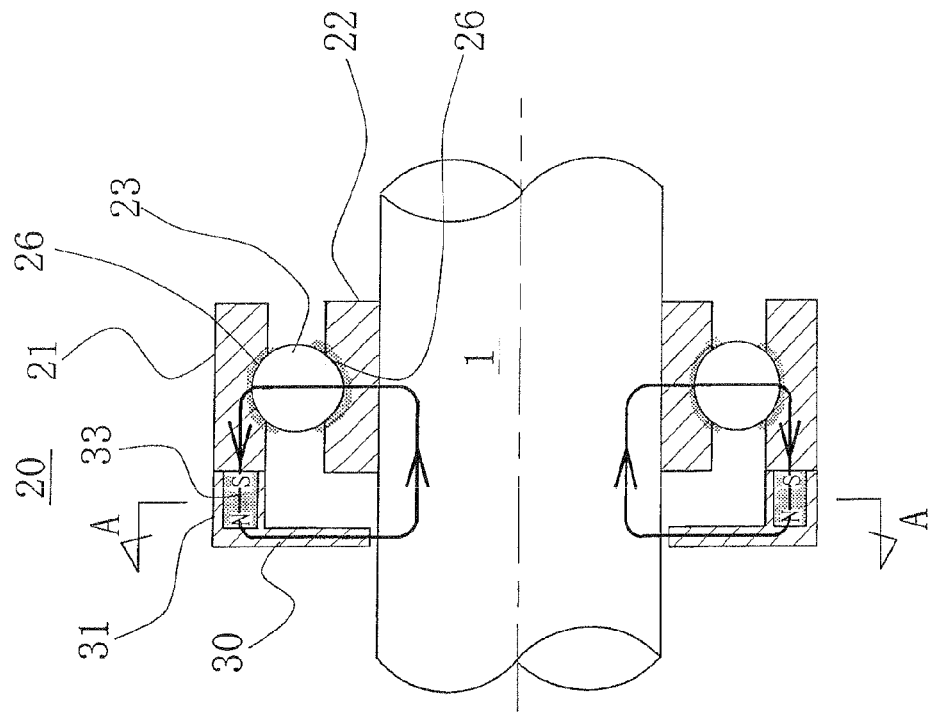
FIGS. 6(a) and 6(b) are views used to describe a rolling bearing according to a fourth embodiment of the present invention in which 6(a) is a front cross-sectional view, and 6(b) is a cross-sectional view along A-A in 6(a)
Figure 6B:
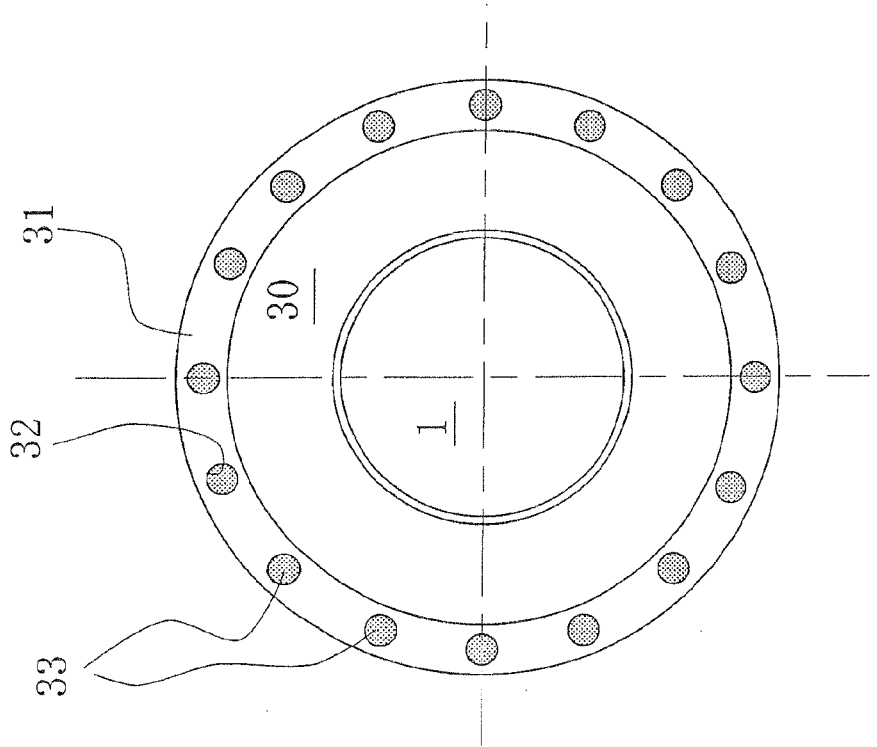

FIGS. 6(a) and 6(b) are views used to describe a rolling bearing 20 according to a fourth embodiment of the present invention in which FIG. 6(a) is a front cross-sectional view, and FIG. 6(b) is a cross-sectional view along A-A in FIG. 6(a).

The basic structure of the rolling bearing 20 according to the fourth embodiment is similar to that according to the third embodiment. In FIGS. 6(a) and 6(b), components denoted by the same reference numerals as those in FIG. 5 are identical to those in FIG. 5.

In FIGS. 6(a) and 6(b), a ring-shaped yoke 30 has an I-shaped cross-section as in the third embodiment. A projecting portion 31 is provided on a side of the yoke 30 facing a magnet 33, a plurality of cylindrical or rectangular recessed portions 32 is provided in a circumferential direction in the projecting portion 31 opening toward the outer race side of the rolling bearing, and a cylindrical magnet 33 is fitted into each recessed portion 32.

By having the magnets 33 held by the yoke 30 in this structure, dimensional precision of the magnets 33 is not required when the yoke 30 is manufactured with dimensional precision, and a rolling bearing 20 with a simple structure can be disposed with dimensional precision, or readily applied to an existing rolling bearing.

5th Embodiment

FIGS. 7(a) and 7(b) are views used to describe a rolling bearing 20 according to a fifth embodiment of the present invention in which FIG. 7(a) is a front cross-sectional view, and FIG. 7(b) is a cross-sectional view along A-A in FIG. 7(a).

The basic structure of the rolling bearing 20 according to the fifth embodiment is similar to that according to the third embodiment. In FIGS. 7(a) and 7(b), components denoted by the same reference numerals as those in FIG. 5 are identical to those in FIG. 5.

In FIGS. 7(a) and 7(b), a ring-shaped yoke 35 has an I-shaped cross-section as in the third embodiment. A plurality of cylindrical or rectangular recessed portions 36 is provided in a circumferential direction in the outer race 34 of the rolling bearing, the recessed portions 36 opening toward the yoke 35, and a magnet 37 being fitted into each of the recessed portions 36.

By having the magnets 37 held by the outer race 34 of the rolling bearing in this structure, dimensional precision of the magnets 37 is not required when the outer race 34 of the rolling bearing is manufactured with dimensional precision, a rolling bearing 20 with a simple structure can be installed with dimensional precision, or space an axial direction of the rolling bearing 20 can be used effectively.

6th Embodiment

Figure 8:
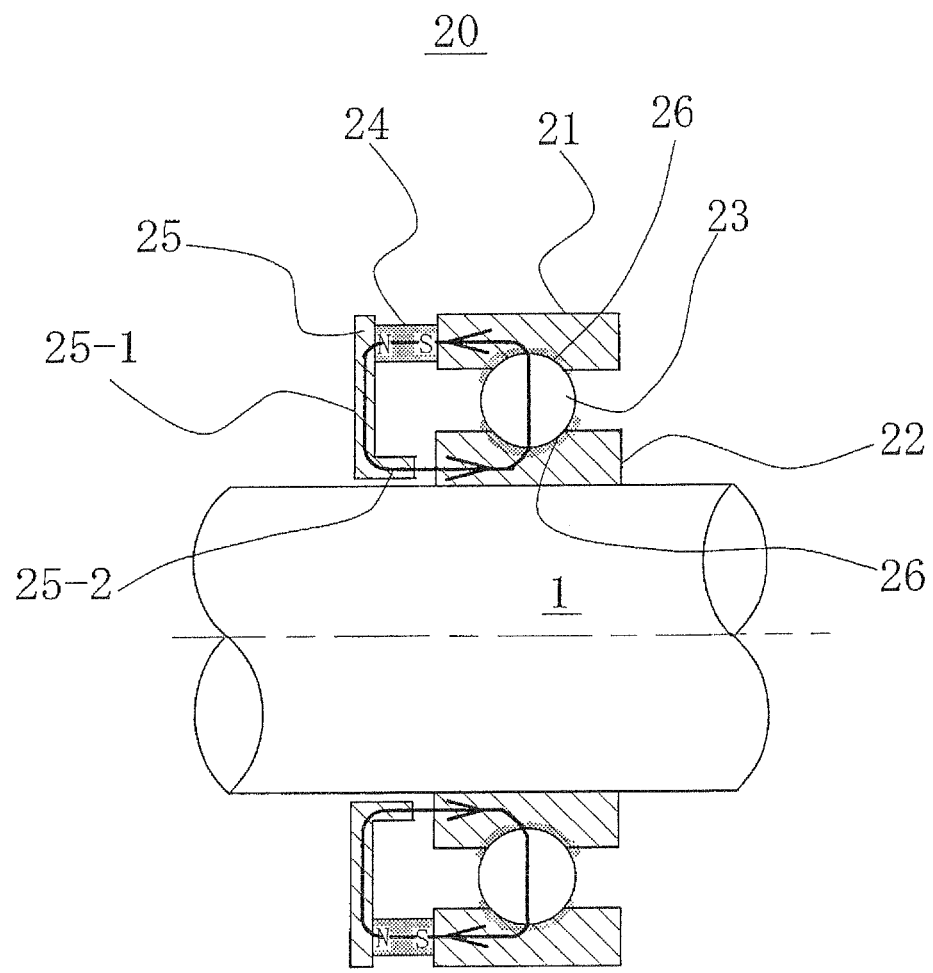
FIG. 8 is a front cross-sectional view used to describe a rolling bearing according to a sixth embodiment of the present invention.

FIG. 8 is a front cross-sectional view used to describe a rolling bearing 20 according to a sixth embodiment of the present invention.

The basic structure of the rolling bearing 20 according to the sixth embodiment is similar to that according to the first embodiment. In FIG. 8, components denoted by the same reference numerals as those in FIGS. 4(a) and 4(b) are identical to those in FIGS. 4(a) and 4(b). The following is a description of the components differing from those in the first embodiment.

In FIG. 8, the magnetic circuit for holding the lubricating magnetic fluid in the portions to be lubricated is formed in the directions indicated by the arrows. In other words, a magnetic circuit is formed from the magnet 24, which is a permanent magnet, via the yoke 25, the inner race 22, the balls 23, and the outer race 21, before returning to the magnet 24. As a result, the rotary shaft 1 can be made from a non-magnetic material, or the horizontal portion 25-2 of the ring-shaped yoke 25 facing the surface of the rotary shaft 1 can be formed so as to be set apart from the surface of the rotary shaft 1.

As a result, an advantage is presented in that the material of the rotary shaft 1 is not limited to a magnetic material.

7th Embodiment

Figure 9:
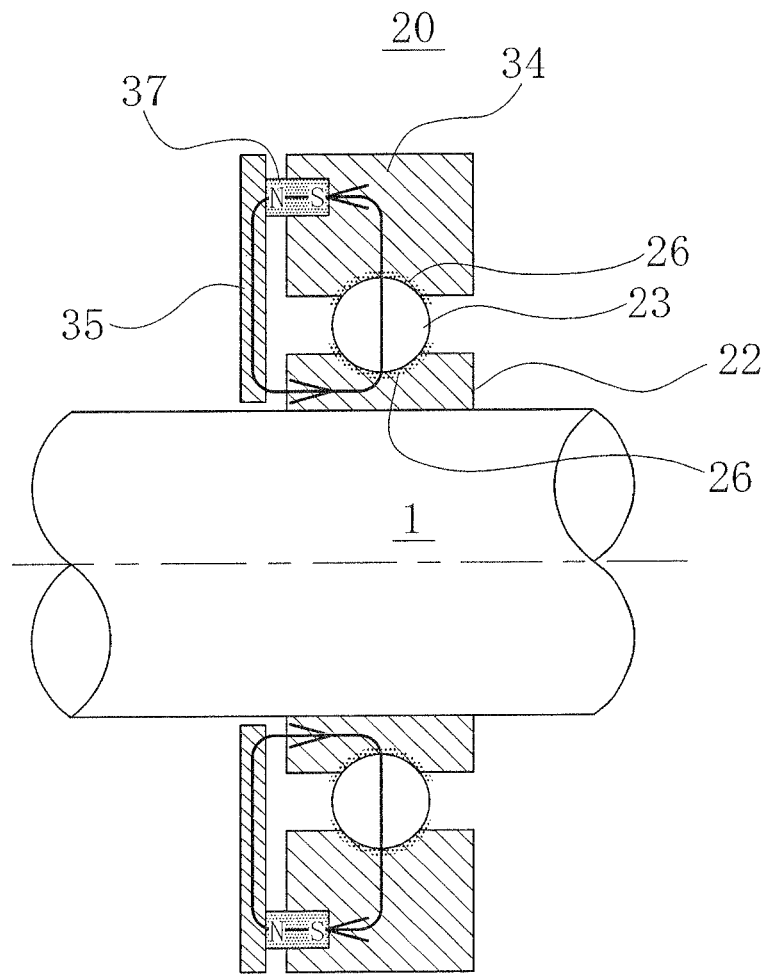
FIG. 9 is a front cross-sectional view used to describe a rolling bearing according to a seventh embodiment of the present invention.

FIG. 9 is a front cross-sectional view used to describe a rolling bearing 20 according to a seventh embodiment of the present invention.

The basic structure of the rolling bearing 20 according to the seventh embodiment is similar to that according to the fifth embodiment. In FIG. 9, components denoted by the same reference numerals as those in FIGS. 7(a) and 7(b) are identical to those in FIGS. 7(a) and 7(b). The following is a description of the components differing from those in the fifth embodiment.

In FIG. 9, the magnetic circuit for holding the lubricating magnetic fluid in the portions to be lubricated is formed in the directions indicated by the arrows. In other words, a magnetic circuit is formed from the magnet 37, which is a permanent magnet, via the yoke 35, the inner race 22, the balls 23, and the outer race 34, before returning to the magnet 37. As a result, the rotary shaft 1 can be made from a non-magnetic material, or the portion of the ring-shaped yoke 37 facing the surface of the rotary shaft 1 can be formed so as to be set apart from the surface of the rotary shaft 1.

As a result, an advantage is presented in that the material of the rotary shaft 1 is not limited to a magnetic material.

8$^{th}$ Embodiment

The rolling bearing according to an eighth embodiment of the present invention will be described with references to FIGS. 10 to 12.

Figure 10:
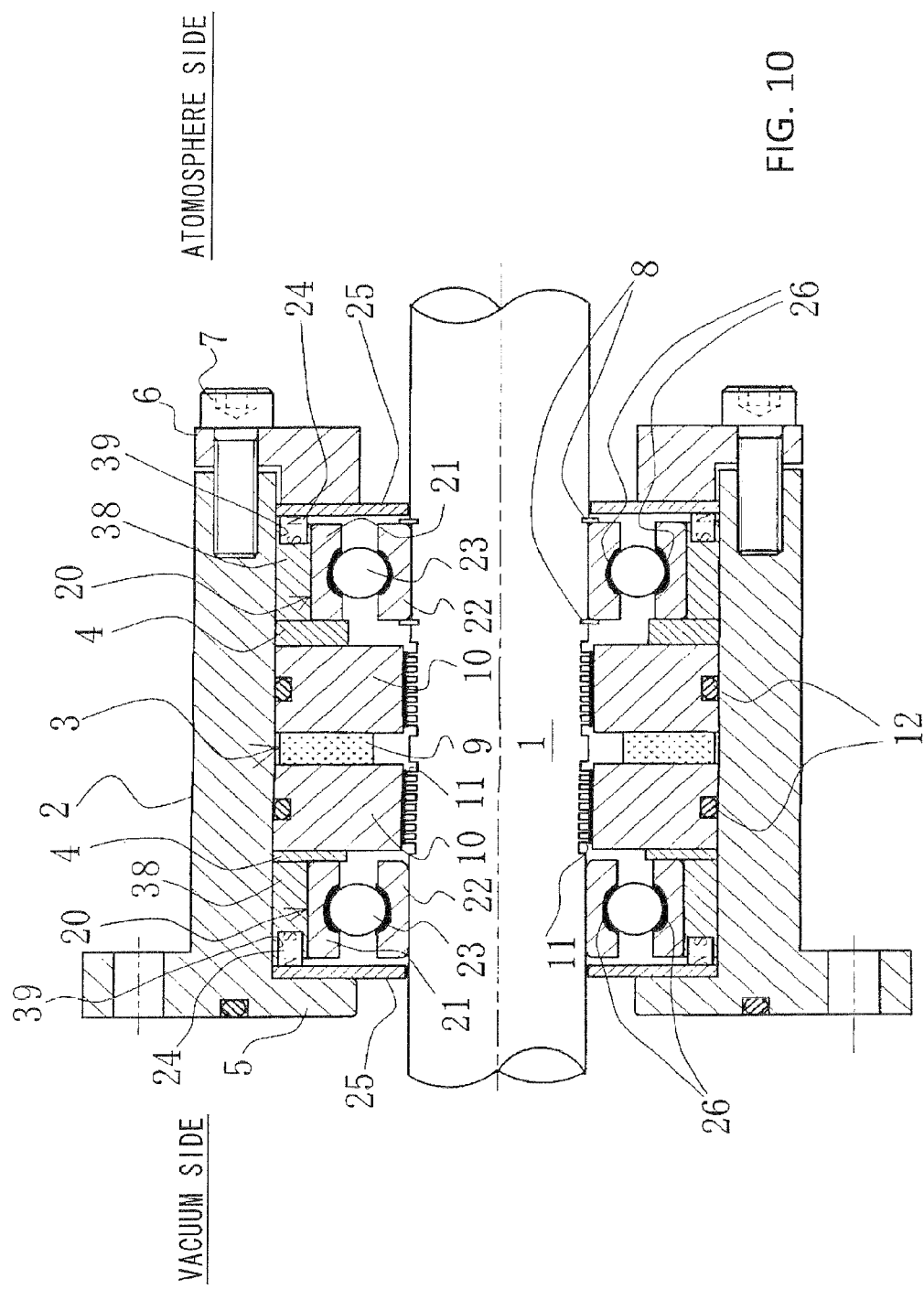
FIG. 10 is a front cross-sectional view in which a rolling bearing according to an eighth embodiment of the present invention is applied to a bearing device provided with a magnetic fluid seal.

FIG. 10 is a front cross-sectional view in which a rolling bearing according to an eighth embodiment of the present invention is applied to a bearing device provided with a magnetic fluid seal. FIGS. 11(a) and 11(b) are views used to describe a rolling bearing according to an eighth embodiment of the present invention, in which FIG. 11(a) is a front cross-sectional view, and FIG. 11(b) is a cross-sectional view along A-A in FIG. 11(a). FIG. 12 is a front cross-sectional view in which a variant of the rolling bearing according to Example 1 of the present invention is applied to a bearing device without a magnetic fluid seal.

Figure 12:
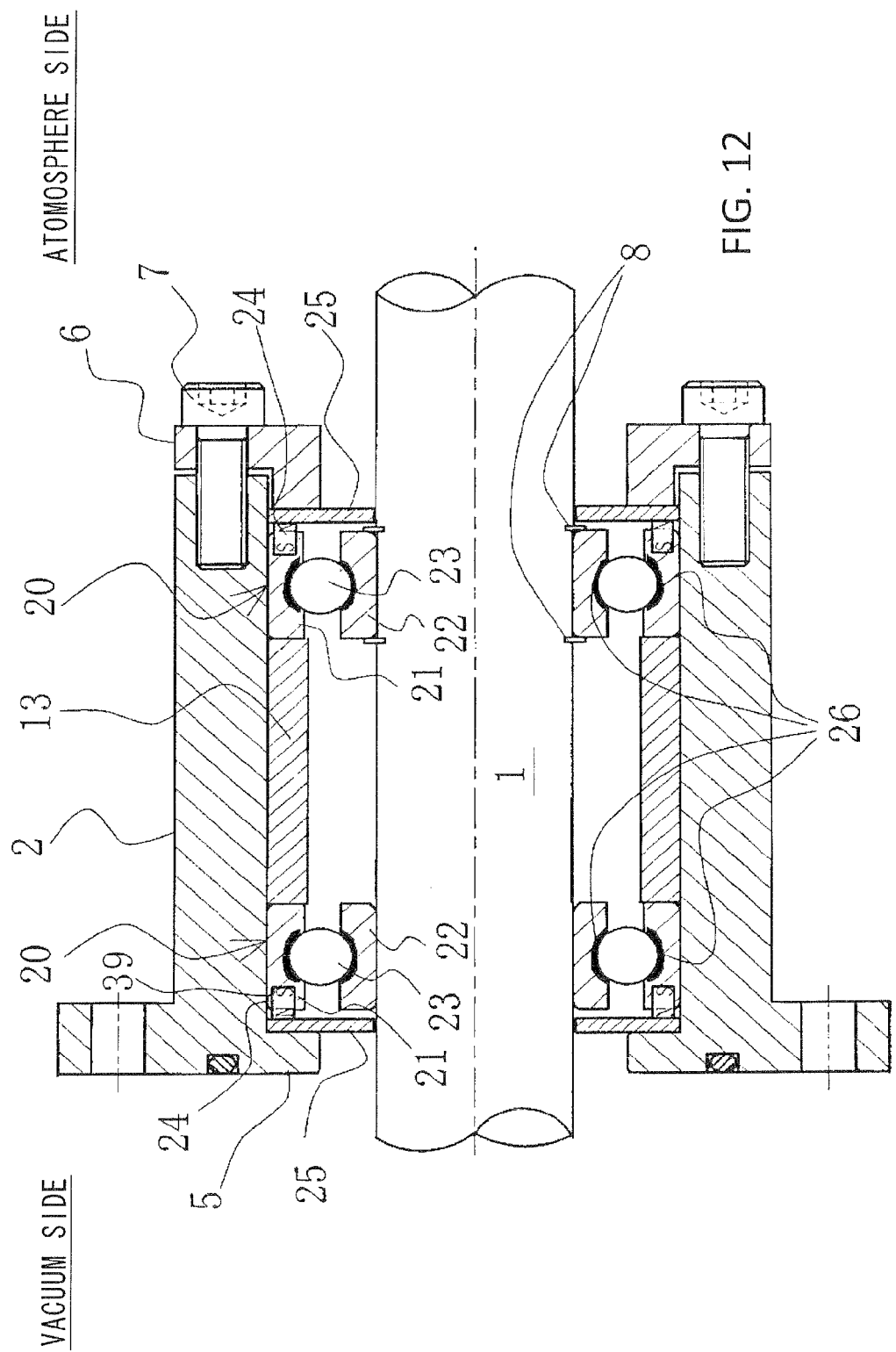
FIG. 12 is a front cross-sectional view in which a rolling bearing according to a modification of the eighth embodiment of the present invention is applied to a bearing device without a magnetic fluid seal.

In FIGS. 10 and 12, the vacuum side is on the left and the atmosphere side is on the right. However, as shall be apparent, a rolling bearing of the present invention can also have the atmosphere on both sides, or have the vacuum on both sides.

In FIG. 10, a bearing device is installed between a housing 2 and a rotary shaft 1, the bearing device rotatably supporting the rotary shaft 1 with the space between the rotary shaft 1 and the housing 2 being sealed. A magnetic fluid seal 3 is arranged in a central portion inside the housing 2, rolling bearings 20, 20 are arranged on both sides of the magnetic fluid seal 3, and a spacer 4 made of a non-magnetic material is interposed between an outer race 21 or inner race 22 of the rolling bearing 20 and the magnetic fluid seal 3 on the vacuum side, and between the outer race 21 of the rolling bearing 20 and the magnetic fluid seal 3 on the atmosphere side.

A step portion 5 is formed on the left end of the housing 2 on the inner peripheral side; the rolling bearing 20 comes into contact with the step portion 5; and the spacer 4, the magnetic fluid seal 3, the spacer 4, and the rolling bearing 20 are arranged in the stated order towards the right, all being immobilized using a retaining ring 6 and a bolt 7 so that pressure is applied on the step portion 5.

A retaining ring 8 is provided on the rotary shaft 1 corresponding to the position of the rolling bearing 20 on the atmosphere side, and the inner race 22 of the rolling bearing 20 is positioned. The magnetic fluid seal 3 is composed of a magnet 9, and pole pieces 10, 10 arranged on both sides of the magnet. A plurality of protruding portions 11 is formed on the outer peripheral surface of the rotary shaft 1 with respect to the pole pieces 10, 10. An O ring 12 is installed on the outer peripheral surface of the pole piece 10, 10, so that the space between the outer peripheral surface of the pole piece and the inner peripheral surface of the housing 2 is sealed.

In FIG. 10, the rolling bearing 20 is a bearing in which are employed ball bearings, rolling bearings, or another rolling element. An outer race 21 is immobilized on the housing 2 through a retainer 38, and an inner race 22 is immobilized on the rotary shaft 1. Balls 23 are fitted between the outer race 21 and the inner race 22.

Magnets 24 are provided on the vacuum-side surface of the retainer 38 of the rolling bearing 20 on the vacuum side, and on the atmosphere side of the retainer 38 of the rolling bearing 20 on the atmosphere side. In addition, an annular yoke 25 made of a magnetic material and loosely fitted to the rotary shaft 1 is provided on the opposite side of the magnets 24 relative to the retainer 38.

Although a case was shown in FIG. 10 in which the outer race 21 is immobilized on the housing 2 through the retainer 38 and the magnets 24 are provided on the retainer 38, the retainer 38 is not essential, and the outer race 21 may be immobilized directly on the housing 2 and the magnets 24 may be provided on the outer race 21. Therefore, in the present invention, "outer-race-side member" is used as a term encompassing both the case that the member is the outer race 21 alone, and the case that the member comprises the outer race 21 and the retainer 38.

In FIG. 10, having a magnetic trap composed of the magnet 24 and the yoke 25 provided on the vacuum surface of the rolling bearing 20 on the vacuum side and the atmosphere side of the rolling bearing 20 on the atmosphere side enables the release of particulate in the vacuum chamber and the atmosphere to be prevented.

In FIG. 10, a magnetic trap is only provided on one side of the rolling bearings 20. A magnetic fluid seal 3 is provided on the side without a magnetic trap. These trap the particulate between the pole piece 10 holding the magnetic fluid and the plurality of protruding portions 11 on the rotary shaft 1. When the lubricating magnetic fluid used in the rolling bearings 20 is different from the magnetic fluid in the magnetic fluid seal and mixing of the two has to be prevented, a magnetic trap is preferably provided on both sides of the rolling bearings 20.

In FIG. 10, having a magnetic trap composed of the magnet 24 and the yoke 25 provided on the vacuum surface of the rolling bearing 20 on the vacuum side and the atmosphere side of the rolling bearing 20 on the atmosphere side was described, but the present invention is not limited to this configuration. As required, the magnetic trap may be provided on either the vacuum side of the rolling bearing 20 on the vacuum side, or the atmosphere side of the rolling bearing 20 on the atmosphere side.

A lubricating magnetic fluid 26 is used as the lubricant for the rolling bearing 20 instead of grease, and this fluid lubricates the portions to be lubricated. In order to suitably lubricate the portions to be lubricated over a long period of time, there may be formed a magnetic circuit for holding the lubricating magnetic fluid in the portions to be lubricated.

In this embodiment, a rotary shaft 1 is formed from a magnetic material. The outer race 21, inner race 22, and balls 23 in the rolling bearing 20 are also magnetic and made of commonly used metals.

Broadly speaking, there are three types of magnetic fluids: water-based magnetic fluids, hydrocarbon oil-based magnetic fluids, and fluorine-oil-based magnetic fluids. Hydrocarbon oil-based magnetic fluids and fluorine-based magnetic fluids are used in the rolling bearings 20 of the present invention because they have a low vapor pressure and are unlikely to evaporate in a high vacuum at high temperatures.

Therefore, in the present invention, the lubricating magnetic fluid especially refers to a hydrocarbon oil-based magnetic fluid or a fluorine-based magnetic fluid.

Also, a permanent magnet made of an organic material or the like filled with, for example, a metal or a magnetic powder may be used as the magnet 24.

In FIGS. 11(a) and 11(b), the yoke 25 is ring-shaped and has an inner diameter slightly larger than the diameter of the rotary shaft 1 so as to be loosely fitted on the rotary shaft 1. The cross-sectional shape is I-shaped. There is a slight gap between the yoke 25 and the surface of the rotary shaft 1, and the distance d1 between the surface of the rotary shaft 1 and the inner peripheral surface of the yoke 25 is less than the distance d2 between the inner race 22 and the yoke 25. The yoke 25 amplifies the adsorption power of the magnet 24, and is constituted, for example, of a soft iron plate. Yoke 29 has an I-shaped cross-section. This makes the yoke 29 easier to be manufactured.

The rotary shaft 1 is formed from a magnetic material; the outer race 21, inner race 22, and balls 23 for the rolling bearing 20 are also magnetic; and a magnetic circuit is formed in the directions indicated by the arrows. In other words, a magnetic circuit is formed from the magnet 24, which is a permanent magnet, via the yoke 25, the rotary shaft 1, the inner race 22, the balls 23, the outer race 21, and the retainer 38, before returning to the magnet 24. As a result, the lubricating magnetic fluid 26 is held between the balls 23 and the outer race 21, and between the balls 23 and the inner race 22. Even should the balls 23 turning generate particulate such as magnetic fluid, the particulate is trapped by the yoke 25, and prevented from infiltrating to the vacuum side. There is a slight gap between the yoke 25 and the surface of the rotary shaft 1, and particulate is believed to infiltrate the vacuum side through this gap. However, since a magnetic circuit is formed between the inner peripheral surface of the yoke 25 and the surface of the rotary shaft 1, the particulate is efficiently trapped and cannot enter the vacuum side.

Recessed portions 39 are provided so as to open to the side of the yoke 25 of the retainer 38 of the rolling bearing 20 on the vacuum side (vacuum side) and the side of the yoke 25 of the retainer 38 of the rolling bearing 20 on the atmosphere side (atmosphere side). Made for fitting in the magnets 24, the recessed portions 39 are cylindrical or rectangular, for example, and a plurality of the recessed portions 39 is provided in a circumferential direction of the retainer 38. The depth of each recessed portion 39 is less than the length of each magnet 24, which was made cylindrical or rectangular, so that when the magnet 24 is fitted in, a portion of the magnet 24 protrudes from the recessed portion 39, and the end face of the projecting portion contacts the side face of the yoke 25 on the outer peripheral side.

By having the structure of the retainer 38 holding the magnet 24, dimensional precision of the magnet 24 is not required provided that the retainer 38 is manufactured with dimensional precision, the rolling bearing 20 with a simple structure can be installed with dimensional precision, and space in an axial direction of the rolling bearing 20 can be used effectively without having too much space. Because the outer race of the rolling bearing 20 does not require machining, a commercial rolling bearing may be used without modification.

Modification of 8$^{th}$ Embodiment

The bearing device of FIG. 12 differs from the bearing device indicated by FIGS. 10, 11(a) and 11(b) on the point that the outer race 21 is immobilized directly on the housing 2 and the magnets 24 are provided on the outer race 21, and a spacer 13, which is long in an axial direction, has been provided instead of the magnetic fluid seal 3 and the spacer 4. The rest of the configuration, however, is the same as FIGS. 10, 11(a) and 11(b), and duplicate descriptions will not be repeated.

In the bearing device of FIG. 12, the outer race 21 is immobilized on the housing 2, a spacer 13 comprising a non-magnetic material is arranged in a center portion of the housing 2, and rolling bearings 20, 20 are arranged on both sides of the spacer 13.

In FIG. 12, recessed portions 39 are provided so as to open to the side of the yoke 25 of the outer race 21 of the rolling bearings 20. Made for fitting in the magnets 24, the recessed portions 39 are cylindrical or rectangular, for example, and a plurality of the recessed portions 39 is provided in a circumferential direction of the outer race 21. The depth of each recessed portion 39 is less than the length of each magnet 24, which was made cylindrical or rectangular, so that when the magnet 24 is fitted in, a portion of the magnet 24 protrudes from the recessed portion 39, and the end face of the projecting portion contacts the side face of the yoke 25 on the outer peripheral side.

By having the structure of the outer race 21 holding the magnet 24, dimensional precision of the magnet 24 is not required provided that the outer race 21 is manufactured with dimensional precision, the rolling bearing 20 with a simple structure can be installed with dimensional precision, and space in an axial direction of the rolling bearing 20 can be used effectively without having too much space. The dimension in a radial direction can also be made smaller compared to the case of providing a spacer 38.

Having a magnetic trap composed of the magnet 24 and the yoke 25 provided on both the vacuum side and the atmosphere side enables the release of particulate in the vacuum chamber and the atmosphere to be prevented.

The reason for having a magnetic trap provided only on the vacuum side and atmosphere side of the rolling bearings 20 in FIG. 12 is that the two rolling bearings are set apart from each other, and even if particulate is released on the vacuum side and the atmosphere side, it will be trapped and prevented from flowing out by the magnetic traps on both ends. Thus, the design can call for the provision of a magnetic trap on one or both sides of the rolling bearings 20.

In FIG. 12, having a magnetic trap composed of the magnet 24 and the yoke 25 provided on the vacuum side of the rolling bearing 20 on the vacuum side and the atmosphere side of the rolling bearing 20 on the atmosphere side was described, but the present invention is not limited to this configuration. As required, the magnetic trap may be provided on either the vacuum side of the rolling bearing 20 on the vacuum side, or the atmosphere side of the rolling bearing 20 on the atmosphere side.

9$^{th}$ Embodiment

The rolling bearing according to a 9$^{th}$ embodiment of the present invention will be described with reference to FIG. 13.

The rolling bearing 20 according to the ninth embodiment differs from the eighth embodiment in that the magnetic circuit is not configured through the rotating shaft. The rest of the configuration, however, is the same as FIG. 10, and duplicate descriptions will not be repeated.

Figure 13:
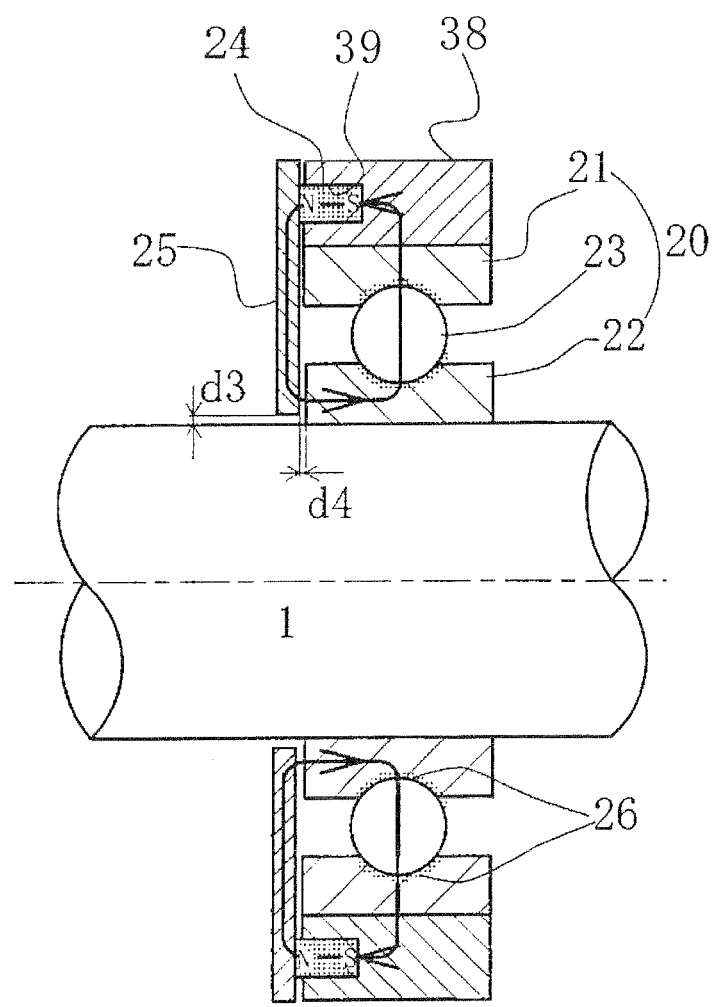
FIG. 13 is a front cross-sectional view used to describe a rolling bearing according to a ninth embodiment of the present invention.

In FIG. 13, the rotary shaft 1 is made from a non-magnetic material, or formed so that the ring-shaped inner peripheral surface of the yoke 25 is set apart from the surface of the rotary shaft 1. Specifically, the distance d3 between the surface of the rotary shaft 1 and the inner peripheral surface of the yoke 25 is greater than the distance d4 between the inner race 22 and the yoke 25. Therefore, a magnetic circuit produced when the lubricating magnetic fluid is retained by the lubrication portion is formed between the magnets 24, the yoke 25, the inner race 22, the ball 23, and the outer race 21, and the retainer 38.

In the ninth embodiment, by having the structure of the retainer 38 holding the magnet 24, dimensional precision of the magnet 24 is not required provided that the retainer 38 is manufactured with dimensional precision, the rolling bearing 20 with a simple structure can be installed with dimensional precision, and space in an axial direction of the rolling bearing 20 can be used effectively without having too much space. Because the outer race of the rolling bearing 20 does not require machining, a commercial rolling bearing may be used without modification, and the additional advantage is obtained that the material of the rotary shaft 1 is not limited to a magnetic material.

Figure 14:
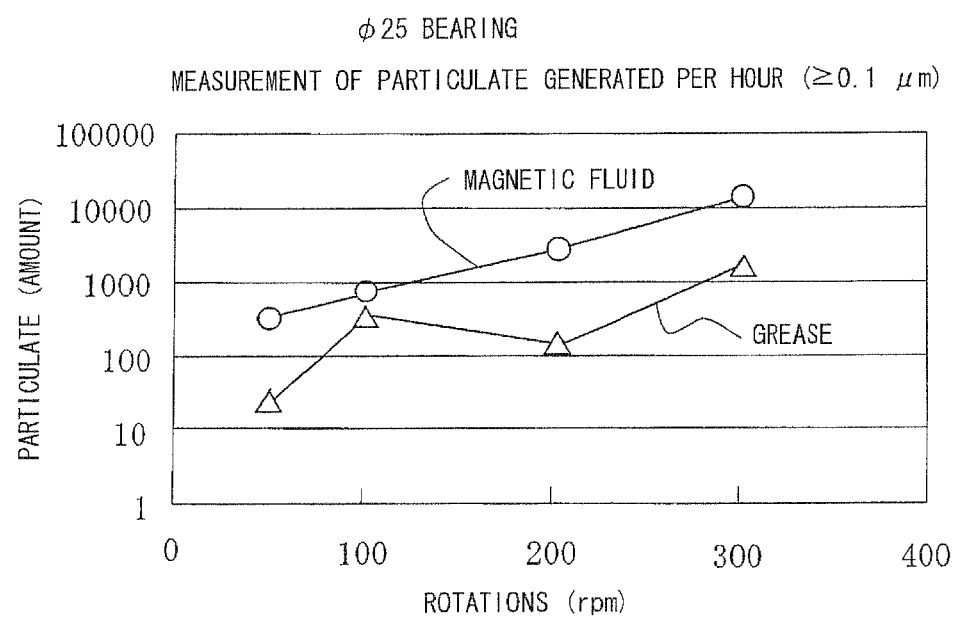
FIG. 14 is a graph showing a measurement of the amount of particulate generated per hour when grease is used as the lubricant for an ordinary rolling bearing, and when a magnetic fluid is used as the lubricant and the magnetic fluid is immobilized by a magnetic circuit using magnets.

FIG. 14 is a graph showing a measurement of the amount of particulate generated per hour when grease is used as the lubricant for an ordinary rolling bearing, and when a magnetic fluid is used as the lubricant and the magnetic fluid is immobilized by a magnetic circuit using magnets (referred to below as "a case in which there is no magnetic trap using magnetic fluid").

In this measurement test, the trapping effect of a magnetic trap was confirmed when magnetic fluid was immobilized using a magnetic circuit. In order to do so, a weak magnetic field was established and a state conducive to particulate formation was produced.

When a bearing having a diameter of 25 mm was caused to rotate in a range from 50 to 300 rpm, and measurements were made, the per-hour number of particles having a size equal to or greater than 0.1 μm became larger as the rotational speed increased. When there was no magnetic trap using magnetic fluid, the number of particles generated at all speeds was greater than a case in which grease was used.

Figure 15A:
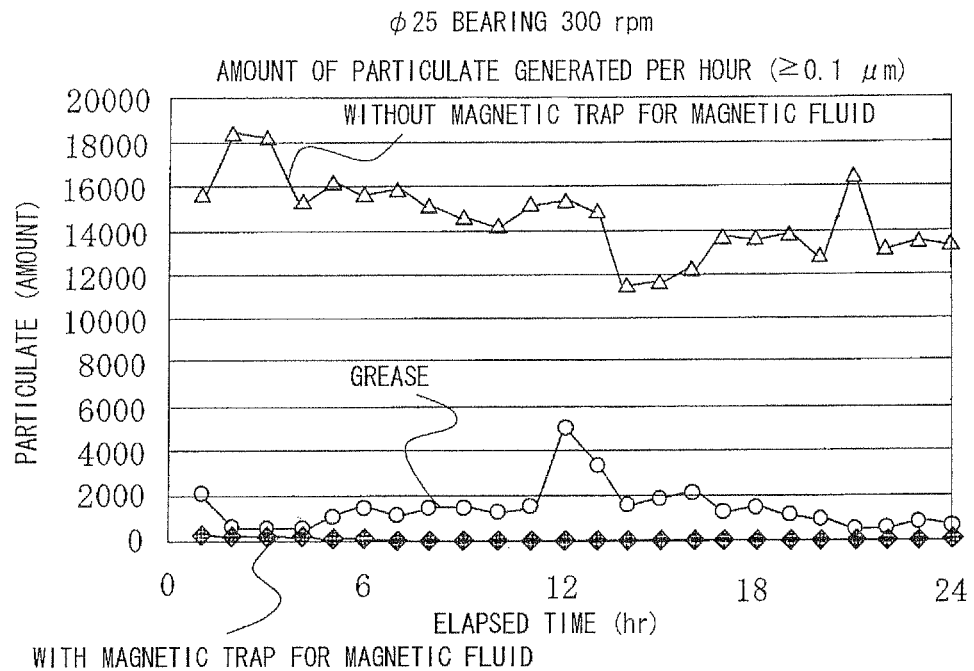
FIGS. 15(a) and 15(b) are graphs showing a measurement of the amount of particulate generated per hour over the elapsed time when grease is used as the lubricant for an ordinary rolling bearing, when a magnetic fluid is used as the lubricant and the magnetic fluid is immobilized by a magnetic circuit using magnets, and when a magnetic fluid is used as the lubricant, the magnetic fluid is immobilized by a magnetic circuit using magnets, and a magnetic trap (magnets and yoke) is installed according to the present invention.
Figure 15B:
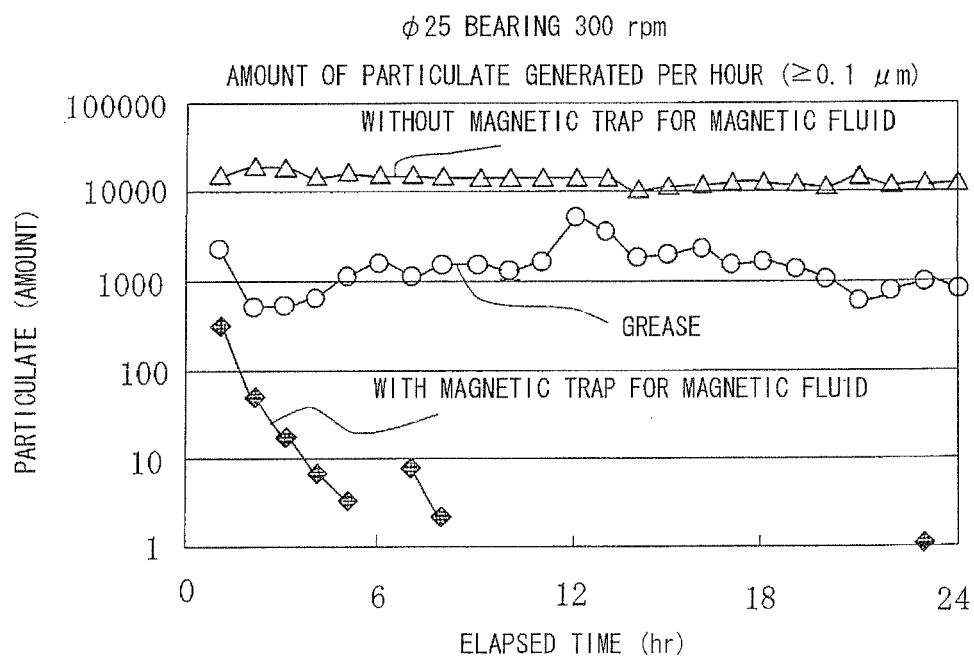
Figure 16:
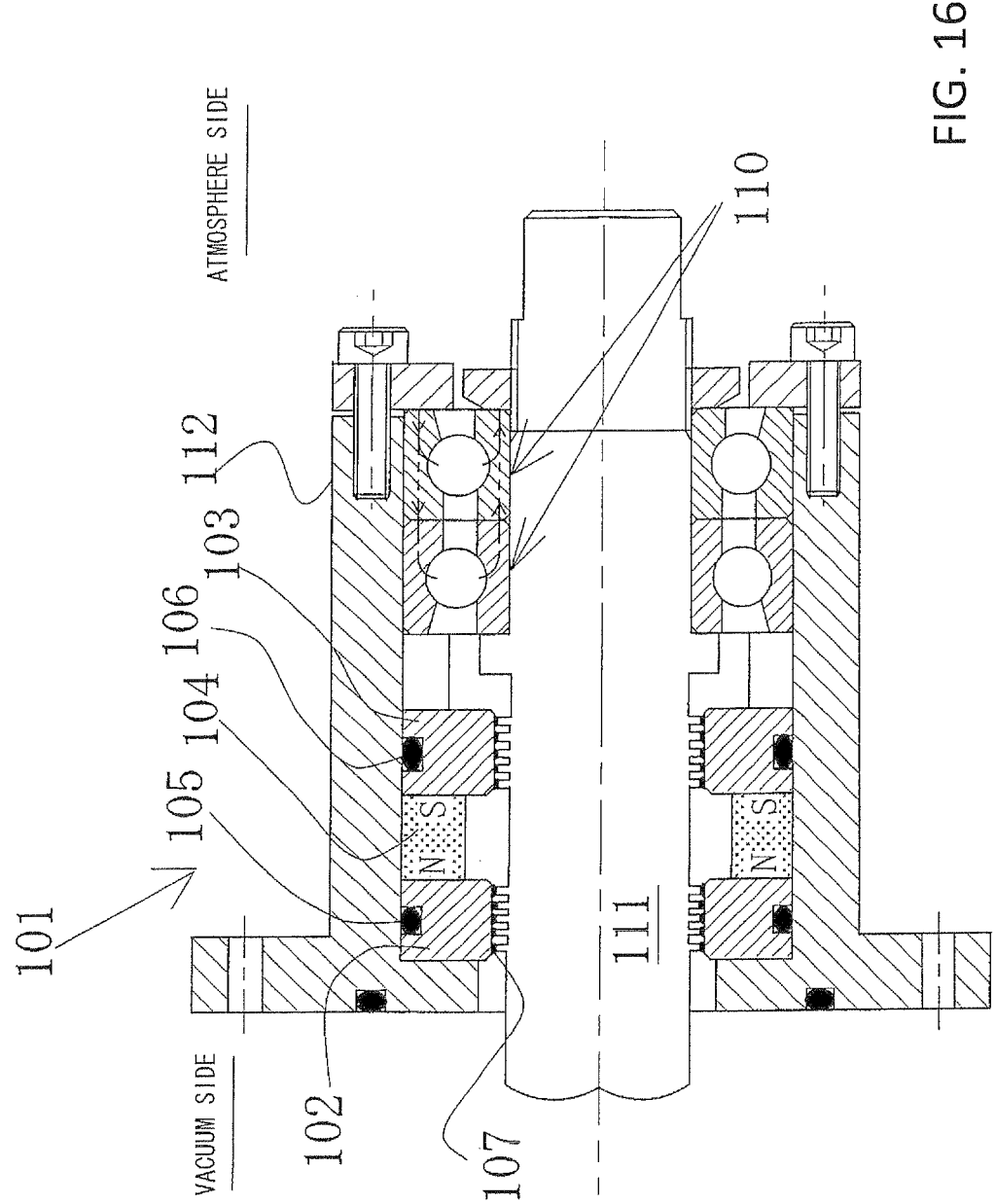
FIG. 16 is a front cross-sectional view of Prior Art 1.
Figure 17:
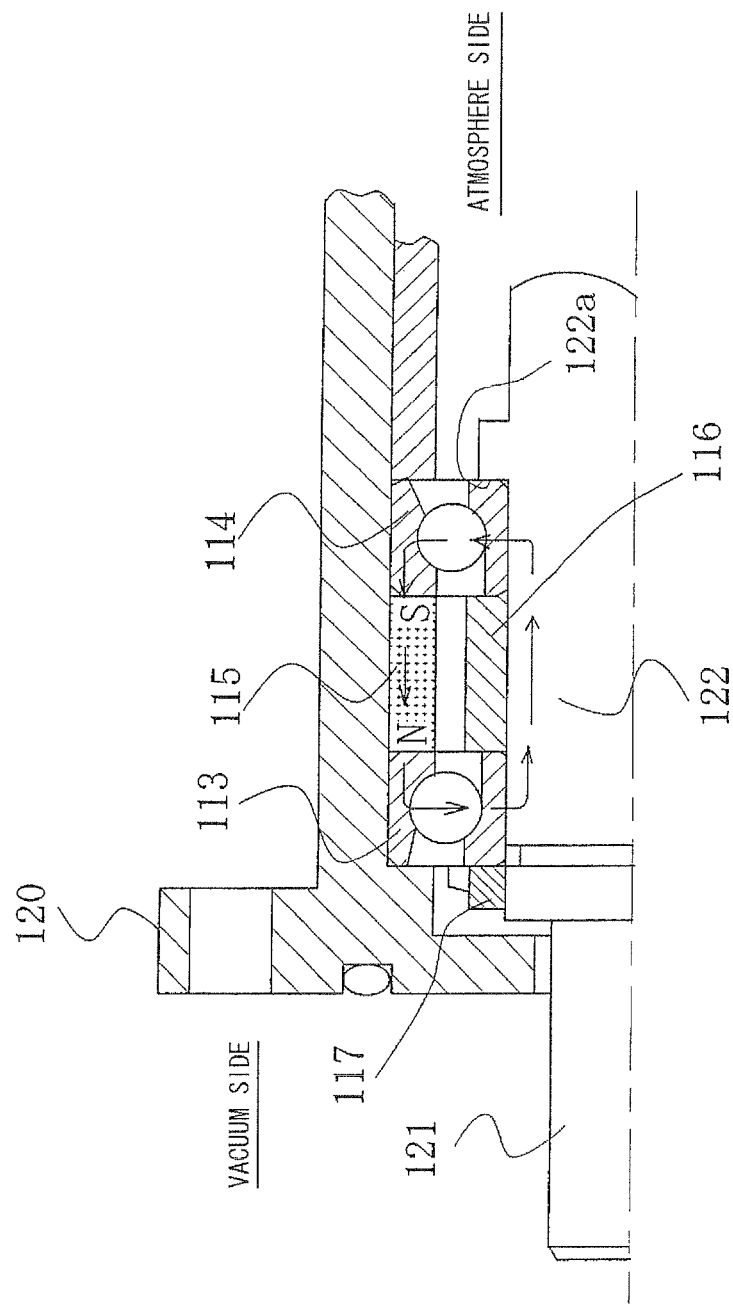
FIG. 17 is a front cross-sectional view of Prior Art 3.

FIGS. 15(a) and 15(b) are graphs showing a measurement of the amount of particulate generated per hour over the elapsed time in a case in which grease is used as the lubricant for an ordinary rolling bearing, in a case in which there is no magnetic trap using magnetic fluid, and in a case in which a magnetic fluid is used as the lubricant, the magnetic fluid is immobilized by a magnetic circuit using magnets, and an annular yoke (magnetic trap) according to the present invention is installed (referred to below as a "case in which there is a magnetic trap using magnetic fluid"). In this measurement, a bearing having a diameter of 25 mm was used, and was caused to rotate at 300 rpm.

In this measurement test, the trapping effect of a magnetic trap was confirmed when magnetic fluid was immobilized by a magnetic circuit. In order to do so, a weak magnetic field was established and a state conducive to particulate formation was produced.

FIGS. 15 (*a*) and (*b*) indicate the same measurement results, but FIG. 15 (*b*) is a semilogarithmic graph which allows the number of particles generated when a magnetic trap with magnetic fluid is used and when grease is used to be more easily viewed.

As shown in FIG. 15(*a*), the number of particles generated per hour is mostly unrelated to the passage of time when a magnetic trap with magnetic fluid is not used. When grease is used as a lubricant for a typical rolling bearing, the number of particles generated per hour is approximately one-eighth the number generated when a magnetic trap with magnetic fluid is not used. However, the number of particles generated rises suddenly before or after twelve hours have elapsed. Even within another small time frame, it is evident that approximately 1,000 particles are generated each hour.

In contrast, when there is a magnetic trap with the magnetic fluid, as is clear from FIG. 15 (*b*), approximately 500 particles per hour are generated immediately after the start of operation. However, this number declines rapidly as time passes. After several hours of operation, the number is reduced to several particles per hour. Afterwards, hardly any particulate is generated.

It is clear from the measurement results that the particulate is reliably trapped by the yoke in a rolling bearing in which an annular yoke (magnetic trap) of the present invention has been installed.

The invention claimed is:

1. A rolling bearing used in a power transmission device for transmitting power such as turning force, the rolling bearing characterized in that a magnet for holding in a lubrication portion of said rolling bearing a lubricating magnetic fluid for lubricating said lubrication portion is provided on at least one side of an outer race of the rolling bearing, an annular yoke made of a magnetic material loosely fitted to a rotating shaft is provided on the opposite side of said magnet relative to an outer-race-side member, a cross-sectional profile of said yoke has an I-shape, and said magnet is fitted into a recessed portion provided so as to open toward said yoke at said outer-race-side member.

2. The rolling bearing according to claim 1, characterized in that the rotating shaft is formed from a magnetic material, the distance between a surface of said rotating shaft and an inner peripheral surface of said yoke is less than the distance between an inner race of said rolling bearing and said yoke, and a magnetic circuit produced when the lubricating magnetic fluid is retained by the lubrication portion is formed by the magnet and the yoke, as well as the rotating shaft, the inner race of the rolling bearing, a ball, and outer-race-side member.

3. The rolling bearing according to claim 1, characterized in that the rotating shaft is formed from a magnetic material or a non-magnetic material, the distance between a surface of said rotating shaft and the inner peripheral surface of said yoke is greater than the distance between an inner race of said rolling bearing and said yoke, and a magnetic circuit produced when the lubricating magnetic fluid is retained by the lubrication portion is formed by the magnet and the yoke, as well as the inner race of the rolling bearing, a ball, and the outer-race-side member.

4. The rolling bearing according to claim 1, characterized in that said recessed portion is cylindrical or rectangular, and are provided in a plurality in a circumferential direction.

5. The rolling bearing according to claim 2, characterized in that said recessed portion is cylindrical or rectangular, and are provided in a plurality in a circumferential direction.

6. The rolling bearing according to claim 3, characterized in that said recessed portion is cylindrical or rectangular, and are provided in a plurality in a circumferential direction.

* * * * *